(12) United States Patent
Page et al.

(10) Patent No.: US 8,413,752 B2
(45) Date of Patent: Apr. 9, 2013

(54) ROBOTIC VEHICLE

(75) Inventors: Richard Page, Middleton, MA (US); Tucker Kuhe, Acton, MA (US); Lee F. Sword, Hollis, NH (US); Adam P. Couture, Allston, MA (US)

(73) Assignee: iRobot Corporation, Bedford, MA (US)

( * ) Notice: Subject to any disclaimer, the term of this patent is extended or adjusted under 35 U.S.C. 154(b) by 514 days.

(21) Appl. No.: 12/696,749

(22) Filed: Jan. 29, 2010

(65) Prior Publication Data

US 2011/0005846 A1    Jan. 13, 2011

Related U.S. Application Data

(63) Continuation-in-part of application No. 11/762,315, filed on Jun. 13, 2007, now Pat. No. 7,891, 446.

(60) Provisional application No. 60/828,606, filed on Oct. 6, 2006.

(51) Int. Cl.
*B60R 16/04* (2006.01)
*B62D 55/065* (2006.01)
*B62D 55/075* (2006.01)

(52) U.S. Cl. .......... 180/68.5; 180/8.7; 180/9.32

(58) Field of Classification Search .......... 180/7.1, 180/8.1, 8.2, 8.7, 9.32, 9.5, 68.5; 901/1, 901/48
See application file for complete search history.

(56) References Cited

U.S. PATENT DOCUMENTS

| | | | |
|---|---|---|---|
| 1,069,761 A | 8/1913 | Buckley | |
| 2,917,120 A | 12/1959 | Gates et al. | |
| 3,092,200 A | 6/1963 | Chambers | |
| 3,166,138 A | 1/1965 | Dunn, Jr. | |
| 3,288,234 A | 11/1966 | Feliz | |
| 3,311,424 A | 3/1967 | Taylor | |
| 3,489,236 A | 1/1970 | Goodwin | |

(Continued)

FOREIGN PATENT DOCUMENTS

| | | |
|---|---|---|
| JP | 60176871 | 9/1985 |
| JP | 63203483 | 8/1988 |

(Continued)

OTHER PUBLICATIONS

Autonomous Mobile Robots, Chapter 2; Locomotion Concepts Oct. 9, 2004.

(Continued)

*Primary Examiner* — James Kramer
*Assistant Examiner* — Wesley Potter
(74) *Attorney, Agent, or Firm* — Fish & Richardson P.C.

(57) ABSTRACT

A robotic vehicle includes a chassis supported on right and left driven tracks, right and left elongated flippers disposed on corresponding sides of the chassis, and a battery unit holder disposed on the chassis for removably receiving a battery unit weighing at least 50 lbs. The battery unit holder includes a guide for receiving and guiding the battery unit to a connected position and a connector mount having locating features and communication features. The locating features receive corresponding locating features of the battery unit, as the battery unit is moved to its connected position, to align the communication features of the connector mount with corresponding communication features of the battery unit. The communication features of the connector mount are movable in a plane transverse to the guide to aid alignment of the communication features for establishment of an electrical connection therebetween when the battery unit is in its connected position.

17 Claims, 31 Drawing Sheets

U.S. PATENT DOCUMENTS

| | | |
|---|---|---|
| 3,869,011 A | 3/1975 | Jensen |
| 4,009,761 A | 3/1977 | Meyer |
| 4,027,889 A | 6/1977 | Krofchalk et al. |
| 4,247,125 A | 1/1981 | Rayment |
| 4,450,400 A * | 5/1984 | Gwyn .......................... 320/109 |
| 4,477,998 A | 10/1984 | You |
| 4,483,407 A | 11/1984 | Iwamoto et al. |
| 4,492,058 A | 1/1985 | Goldfarb et al. |
| 4,566,550 A | 1/1986 | Misawa |
| 4,566,551 A | 1/1986 | Feliz |
| 4,566,707 A | 1/1986 | Nitzberg |
| 4,570,954 A | 2/1986 | Mintz |
| 4,645,222 A | 2/1987 | Hester |
| 4,674,585 A | 6/1987 | Barlow et al. |
| 4,687,068 A | 8/1987 | Pagett |
| 4,688,813 A | 8/1987 | Misawa et al. |
| 4,702,331 A | 10/1987 | Hagihara et al. |
| 4,709,773 A | 12/1987 | Clement et al. |
| 4,730,684 A | 3/1988 | Pedersen |
| 4,813,906 A | 3/1989 | Matsuyama et al. |
| 4,820,189 A * | 4/1989 | Sergeant et al. .............. 439/395 |
| 4,898,256 A | 2/1990 | Lehner |
| 4,919,489 A | 4/1990 | Kopsco |
| 4,932,491 A | 6/1990 | Collins, Jr. |
| 4,932,831 A | 6/1990 | White et al. |
| 4,977,971 A | 12/1990 | Crane, III et al. |
| 4,993,912 A | 2/1991 | King et al. |
| 5,022,812 A | 6/1991 | Coughlan et al. |
| 5,174,405 A | 12/1992 | Carra et al. |
| 5,197,558 A | 3/1993 | Misawa |
| 5,248,008 A | 9/1993 | Clar |
| 5,301,765 A * | 4/1994 | Swanson ...................... 180/68.5 |
| 5,308,098 A | 5/1994 | Shea |
| 5,337,846 A | 8/1994 | Ogaki et al. |
| 5,360,307 A * | 11/1994 | Schemm et al. .............. 414/343 |
| 5,413,367 A | 5/1995 | Ochiai |
| 5,443,354 A | 8/1995 | Stone et al. |
| 5,507,358 A | 4/1996 | Abe et al. |
| 5,515,934 A | 5/1996 | Davis |
| 5,542,488 A * | 8/1996 | Nixon .......................... 180/65.1 |
| 5,579,857 A | 12/1996 | Abe et al. |
| 5,585,205 A * | 12/1996 | Kohchi .......................... 429/99 |
| 5,641,030 A | 6/1997 | Toselli |
| 5,833,248 A | 11/1998 | Eguchi |
| 5,868,403 A | 2/1999 | Culp et al. |
| 5,884,718 A | 3/1999 | Yamashiro et al. |
| 5,890,553 A | 4/1999 | Bar-Cohen et al. |
| 5,921,843 A | 7/1999 | Skrivan et al. |
| 6,099,091 A | 8/2000 | Campbell |
| 6,144,180 A | 11/2000 | Chen et al. |
| 6,158,536 A | 12/2000 | Misawa |
| 6,216,807 B1 | 4/2001 | Eckhoff |
| 6,263,989 B1 | 7/2001 | Won |
| 6,267,196 B1 | 7/2001 | Wilcox et al. |
| 6,431,296 B1 | 8/2002 | Won |
| 6,523,629 B1 | 2/2003 | Buttz et al. |
| 6,619,414 B2 | 9/2003 | Rau |
| 6,631,775 B1 * | 10/2003 | Chaney ........................ 180/68.5 |
| 6,668,951 B2 | 12/2003 | Won |
| 6,938,553 B2 * | 9/2005 | Tamaki et al. .................. 104/34 |
| 6,999,849 B2 | 2/2006 | Bridges |
| 7,083,013 B2 | 8/2006 | Chuan |
| 7,413,045 B2 * | 8/2008 | Tien ............................ 180/68.5 |
| 7,475,745 B1 | 1/2009 | DeRoos |
| 7,712,563 B2 * | 5/2010 | Niebuhr ...................... 180/68.5 |
| 8,146,694 B2 * | 4/2012 | Hamidi ........................ 180/68.5 |
| 2002/0062999 A1 | 5/2002 | De-Noor et al. |
| 2002/0189871 A1 | 12/2002 | Won |
| 2003/0183428 A1 | 10/2003 | Hedeen |
| 2004/0144580 A1 * | 7/2004 | Wu ............................. 180/68.5 |
| 2004/0168842 A1 | 9/2004 | Chuan |
| 2006/0037789 A1 | 2/2006 | Kritman et al. |
| 2007/0029117 A1 | 2/2007 | Goldenberg et al. |
| 2007/0221423 A1 * | 9/2007 | Chang ......................... 180/68.5 |
| 2008/0183332 A1 | 7/2008 | Ohm et al. |

FOREIGN PATENT DOCUMENTS

| | | |
|---|---|---|
| JP | 63203484 | 8/1988 |
| JP | 6032263 | 2/1994 |
| JP | 8152916 | 6/1996 |
| JP | 2003019985 | 1/2003 |
| JP | 2005111595 | 4/2005 |
| WO | WO 89/00928 | 2/1989 |
| WO | 2009/061654 A2 | 5/2009 |

OTHER PUBLICATIONS

Falcone et al. "The Personal Rover" The Robotics Institute Carnegie Mellon University Pittsburgh, PA 15213; 2002.

Authorized Officer Vito Spinelli, International Search Report and Written Opinion for International Application No. PCT/US2011/023044 dated Jan. 31, 2012, 15 pages.

PackBot "iRobot PackBot Explorer" Brochure, 2006.

PackBot "Tactical Mobile Robot" Brochure, 2003.

PackBot "Hazardous Duty Mobile Robot" Brochure, 2003.

* cited by examiner

ROBOTIC VEHICLE

CROSS-REFERENCE TO RELATED APPLICATIONS

This U.S. patent application is a continuation-in-part of, and claims priority under 35 U.S.C. §120 from, U.S. patent application Ser. No. 11/762,315, filed on Jun. 13, 2007, now U.S. Pat. No. 7,891,446, which claims priority under 35 U.S.C. §119(e) to a U.S. provisional patent application 60/828,606 filed on Oct. 6, 2006. The disclosures of these prior applications are considered part of the disclosure of this application and are hereby incorporated by reference in their entireties.

STATEMENT AS TO FEDERALLY SPONSORED RESEARCH

This invention was in part with Government support under contract N41756-06-C-5512 awarded by the Technical Support Working Group of the Department of Defense. The Government may have certain rights in the invention.

TECHNICAL FIELD

This disclosure relates to robotic vehicles.

BACKGROUND

A new generation of robotic systems and tools is required to meet the increasing terrorist threat in the US and abroad. The lack of adaptability and limited capability of existing remote controlled systems available to Hazardous/First Response/Explosive Ordnance Disposal (EOD) teams has frustrated many teams worldwide. The unique and often dangerous tasks associated with the first responder mission require personnel to make quick decisions and often adapt their tools in the field to combat a variety of threats. The tools must be readily available, robust, and yet still provide surgical precision when required.

SUMMARY

According to one aspect of the disclosure, a robotic vehicle includes a chassis having front and rear ends and supported on right and left driven tracks, each track trained about a corresponding front wheel rotatable about a front wheel axis, and right and left elongated flippers disposed on corresponding sides of the chassis and operable to pivot about the front wheel axis of the chassis. Each flipper has a driven track about its perimeter. The robotic vehicle includes a battery unit holder disposed on the chassis for removably receiving a battery unit weighing at least 50 lbs. The battery unit holder includes a guide for receiving and guiding the battery unit to a connected position and a connector mount having locating features and communication features. The locating features receive corresponding locating features of the battery unit, as the battery unit is moved to its connected position, to align the communication features of the connector mount with corresponding communication features of the battery unit. The communication features of the connector mount are movable in a plane transverse to the guide to aid alignment of the communication features for establishment of an electrical connection therebetween when the battery unit is in its connected position.

Implementations of the disclosure may include one or more of the following features. In some implementations, the battery unit holder includes a latch for securing the battery unit in its connected position. The latch may include a gate pivotally coupled to the chassis. The battery unit holder guide may include right and left battery unit guides configured to receive corresponding guide features of the battery unit. In some implementations, the battery unit holder includes right and left side plates having the corresponding right and left battery unit guides and a front plate connected to the right and left side plates. The connector mount of the battery unit holder is disposed on the front plate. The battery unit slides along the battery unit guides to substantially align a connector of the battery unit with the connector mount of the battery unit holder. The guide may be configured to withstand at least a 50 G shock load while remaining operational. In some examples, the locating features of the connector mount include first and second spaced apart projections configured to be received by and mate with corresponding first and second locating receptacles of the battery unit.

Another aspect of the disclosure provides a robotic vehicle that includes a chassis having front and rear ends and supported on right and left driven tracks, each track trained about a corresponding front wheel rotatable about a front wheel axis, and right and left elongated flippers disposed on corresponding sides of the chassis and operable to pivot about the front wheel axis of the chassis. Each flipper has a driven track about its perimeter. The robotic vehicle includes a flipper actuator disposed on the chassis and coupled to the flippers. The right and left flippers are each removably attached to the chassis. Each flipper includes a side arm having a distal end and a pivot end, a connector disposed on the pivot end of the side arm, and a rear wheel rotatably mounted on the shaft with the corresponding track trained about the rear wheel. The connector includes an actuator accessible on a side of the flipper opposite of the chassis, a shaft connected to the pivot end of the side arm, and retractable pawls disposed radially about the shaft and operably coupled to the actuator. The shaft is configured to be received by a shaft receptacle of the chassis and the pawls retract into the shaft upon actuation of the actuator. The pawls translate at least 300 ft-lbs of torque between the flipper actuator and the respective flipper side arm for rotation of the respective flipper about the front wheel axis.

Implementations of the disclosure may include one or more of the following features. In some implementations, the rear wheel includes a drive translation feature configured to engage a corresponding drive translation feature of the respective front wheel of the driven chassis tracks. Each flipper track is driven in unison with the corresponding driven chassis track. The retractable pawls may define a rectangular cross-sectional shape.

In some implementations, the robotic vehicle includes a deck assembly configured to receive a removable payload and a linkage connecting the deck assembly to the chassis. The linkage has a first end rotatably connected to the chassis at a first pivot, and a second end rotatably connected to the deck assembly at a second pivot. Both of the first and second pivots include independently controllable pivot drivers operable to rotatably position their corresponding pivots to control both fore-aft position and pitch orientation of the deck assembly with respect to the chassis. The linkage may be a single unitary link connecting the deck assembly to the chassis. In some implementations, the linkage defines an interior passageway configured to receive cabling routed between the chassis and the deck assembly. In some of those implementations, the linkage further comprises an insulated electrical conductor extending along the enclosed interior passageway. The first pivot is rotatable through an angle of at least 180 degrees. The independently controllable pivot drivers provide both fore-aft position and pitch orientation of the deck assembly with respect to the chassis to selectively displace a center of gravity of the deck assembly both forward and rearward of a center of gravity of the chassis. In some implementations, the first end of the linkage is rotatably connected near the front of the chassis, such that the deck assembly is displaceable to an aftmost position in which the deck assembly is located within a footprint of the chassis. The first pivot of the linkage is located above and forward of the front wheel axis, such that rotation of the linkage about its first and second pivots enables selective positioning of a center of gravity of the deck assembly both fore and aft the front wheel axis.

In some implementations, the deck assembly includes connection points for both a payload power link and a payload communication link. The deck assembly may be configured to receive a removable payload on top and bottom portions of the deck assembly. A controller recognizes the receipt and placement of the payload on the deck assembly. The chassis has a center of gravity between its front and rear ends. Each flipper has a pivot end, a distal end, and a center of gravity therebetween, and the linkage has a center of gravity between its first and second ends. The deck assembly has a leading end, and a trailing end, and a center of gravity therebetween. The second pivot can be disposed on the deck assembly substantially at a mid-point between the leading and trailing ends of the deck assembly. The linkage together with the deck assembly shifts between about 10% and about 50% of the vehicle weight, shifting a combined center of gravity of the vehicle between an aft center of gravity position intermediate the front and rear ends of the chassis and a fore center of gravity position intermediate the distal and pivot ends of the flippers.

Another aspect of the disclosure provides a robotic vehicle that includes a chassis having front and rear ends and supported on right and left driven tracks, each track trained about a corresponding front wheel rotatable about a front wheel axis, and right and left elongated flippers disposed on corresponding sides of the chassis and operable to pivot about the front wheel axis of the chassis. Each flipper has a driven track about its perimeter. The robotic vehicle includes a deck assembly configured to receive a removable payload and a linkage connecting the payload deck to the chassis. The linkage has a first end rotatably connected to the chassis at a first pivot, and a second end rotatably connected to the deck assembly at a second pivot. Both of the first and second pivots include independently controllable pivot drivers operable to rotatably position their corresponding pivots to control both fore-aft position and pitch orientation of the deck assembly with respect to the chassis. The deck assembly includes a deck base pivotably connected to the linkage at the second pivot and electrically connected to the chassis to receive power and communication therefrom. The deck assembly also includes at least one connection point disposed on the deck base and configured to provide a payload power link and a payload communication link. Top and bottom portions of the deck base are each configured to receive a removable payload.

Implementations of the disclosure may include one or more of the following features. In some implementations, the robotic vehicle includes a controller in communication with the deck assembly. The controller recognizes the receipt and placement of a payload on the deck assembly. The top portion of the deck base may receive a modular platform configured to support a removable payload. The chassis has a center of gravity between its front and rear ends. Each flipper has a pivot end, a distal end, and a center of gravity therebetween, and the linkage has a center of gravity between its first and second ends. The deck assembly has a leading end, and a trailing end, and a center of gravity therebetween. The second pivot is disposed on the deck assembly substantially at a mid-point between the leading and trailing ends of the deck assembly. In some examples, the linkage together with the deck assembly shifts between about 10% and about 50% of the vehicle weight, shifting a combined center of gravity of the vehicle between an aft center of gravity position intermediate the front and rear ends of the chassis and a fore center of gravity position intermediate the distal and pivot ends of the flippers. At least a portion of the deck assembly (e.g., deck platform) can have a width at least as wide as the chassis.

Another aspect of the disclosure provides a method of providing power to a robotic vehicle. The method includes sliding a battery unit weighing at least 50 lbs onto a guide of a battery holder of the robotic vehicle and moving the battery unit to a connect position. The guide substantially aligns a connector of the battery unit with a connector mount of the battery holder. The connector mount has locating features and communication features. The locating features receive corresponding locating features of the battery unit as the battery unit is moved to its connected position to align the communication features of the connector mount with corresponding communication features of the battery unit. The communication features of the connector mount are movable in a plane transverse to the guide to aid alignment of the communication features for establishment of an electrical connection therebetween when the battery unit is in its connected position.

Implementations of the disclosure may include one or more of the following features. In some implementations, the method includes securing the battery unit in its connected position, which may entail latching the battery unit to the battery unit holder. The method may include sliding right and left guide features of the battery unit onto corresponding right and left guides of the battery holder.

Another aspect of the disclosure provides a method of servicing a drive system of a robotic vehicle having right and left driven drive tracks supported on a chassis and a flipper rotatably disposed on the chassis on a side of one of the drive tracks opposite of the chassis. The method includes disengaging the flipper from the chassis to access the corresponding drive track, where disengaging the flipper includes actuating a connector of the flipper to retract pawls received by a flipper actuator of the chassis into a shaft of the connector. The pawls are disposed radially about the shaft and are configured to translate at least 300 ft-lbs of torque between the flipper actuator and the flipper for rotation of the flipper. The retractable pawls may define a rectangular cross-sectional shape. The method includes removing the flipper from the chassis by sliding the connector shaft out of the flipper actuator.

According to one aspect of the disclosure, a robotic vehicle includes a chassis having front and rear ends and supported on right and left driven tracks, each track trained about a corresponding front wheel rotatable about a front wheel axis. Right and left elongated flippers are disposed on corresponding sides of the chassis and operable to pivot about the front wheel axis of the chassis, each flipper having a driven track about its perimeter. A linkage connects a deck assembly, configured to support a functional, securely mounted and integrated payload (in some cases, modular payloads, unconnected payloads and/or functional payload), to the chassis. The linkage has a first end rotatably connected to the chassis at a first pivot, and a second end rotatably connected to the deck at a second pivot. Both of the first and second pivots include independently controllable pivot drivers operable to rotatably position their corresponding pivots to control both fore-aft position (as well as vertical position, the pivots being interconnected by a linkage that makes a swept motion) and pitch orientation of the deck assembly with respect to the chassis. In one example, the first pivot is rotatable through an angle of at least 180 degrees. The first pivot is not necessarily limited by a range of motion of the pivot, but rather by those positions in which the linkage, deck assembly, or payload interfere with part of the robot such as the chassis or with the ground—which may depend on the character of the ground and pose of the robot. Accordingly, in another implementation, the sweep of the linkage is limited by the chassis of the robot, which is configured as small tube element connecting chassis arms. The deck assembly and linkage may sweep between the chassis arms and between the flippers in either direction, and may sweep past a horizontal line defined by one chassis track wheel and bogey, in either direction fore or aft of the pivot. In another implementation, the sweep is limited to 74 degrees to improve stability and shock resistance on open ground. In each case, the deck assembly, with or without payload(s), may be tilted to move the center of gravity of the robot further in a desired direction. The linkage may comprise two parallel links spaced apart laterally.

The independently controllable pivot drivers provide both fore-aft position (and a wide sweep range) and pitch orientation of the deck assembly with respect to the chassis to selectively displace a center of gravity of the deck assembly both forward and rearward of a center of gravity of the chassis. This provides enhanced mobility to negotiate obstacles. Hereinafter, center of gravity or center of mass may be abbreviated "CG."

Rotation of the linkage about its first and second pivots enables selective positioning of a center of gravity or center of mass of the deck assembly both fore and aft the front wheel axis as well as both fore and aft of a center of gravity of the chassis. In one implementation, the first pivot of the linkage is located above and forward of the front wheel axis and swings the linkage for displacing the center of gravity of the deck assembly to a desired location. Furthermore, when the first end of the linkage is rotatably connected near the front of the chassis, the deck assembly is displaceable to an aftmost position in which the deck assembly is located within a footprint of the chassis.

In one example, the deck assembly includes connection points for both a functional payload power link and a functional payload communication link, which may comprise an Ethernet link. In one implementation, the functional payload communication link is a packet switched network connectable to a distribution switch or router.

The deck assembly includes an electronics bin (also "CG tub") which holds most of the electronics of the robot (as well as the upper motor(s) for tilting the paylaod deck assembly, but excepting motor control and drivers for the drive motors, which is housed in the chassis), and supports a dockable battery unit slid into the bottom of the electronics bin as well as a accepting a modular payload deck, which defines threaded holes to accept functional payloads and includes multiple functional payload connection pads positioned to accommodate selective connection of multiple functional payload units to the payload deck. Each connection pad includes connection points for both functional payload power and functional payload communication (as well as sufficient hard points nearby for such payloads to be secured to the deck with sufficient fasteners to reliably secure the mass of the payload through tilting operations of the deck). The payload deck can accept as a payload unit a removable radio receiver unit (which can communicate with a remote controller unit) operably connected to a drive system of the chassis. A battery unit is also removable secured to the bottom of the deck, so as to place the significant weight of batteries as low as possible in the mass that is used for shifting the center of gravity of the vehicle. In one example, the payload deck constitutes between about 10 and 50 percent of a total weight of the vehicle. The payload deck may also accept an Ethernet camera as a payload unit.

In one implementation, the payload deck further accepts as payload units removable sensor units. The sensor may be, for example, infrared, chemical, toxic, light, noise, and weapons detection.

The left and right flippers comprise elongated members, wherein flipper tracks are trained about corresponding rear wheels independently rotatable about the front wheel axis.

The robotic vehicle can climb a step by using the independently controllable pivot drivers to control both sweep and pitch orientation of the deck assembly with respect to the chassis to selectively displace the center of gravity of the deck assembly the both forward and rearward of the center of gravity of the chassis. The robotic vehicle may initiates a step climb by pivoting the first and second flippers upward to engage the edge of the step. Different obstacles can be accommodated by different strategies that use the full range of the sweepable and tiltable CG of the entire deck assembly, or of the deck assembly when combined with a payload. An advantage of the disclosed system is that the addition of payload weight on the deck assembly increases the flexibility and mobility of the robot with respect to surmounting obstacles of various shapes. The robotic vehicle also positions the center of gravity of the deck assembly above the front end of the chassis. Next, the robotic vehicle pivots the first and second flippers downward on the edge of the step to engage the top of the step and drives forward. The robotic vehicle continues to displace the center of gravity of the deck assembly beyond the front of the chassis by rotating both the first and second pivots. As shown in FIG. 14, tilting the deck assembly further advances the center of gravity of the entire vehicle. Finally, the robotic vehicle drives forward to pull the chassis over the edge of the step.

In another aspect of the disclosure, a skid steered robot includes a chassis supporting a skid steered drive and a set of driven flippers, each flipper being pivotable about a first pivot axis common with a drive axis of the chassis. A linkage substantially at the leading end of the chassis is pivotable about a second pivot axis. A deck assembly is pivotable about a third pivot axis substantially at a distal end of the linkage. The deck assembly includes a power supply, a packet network connection, a modular deck support structure; and a modular deck. The modular deck includes a deck mount which fits the modular deck support structure and at least two externally available common connectors. At least one of the deck assembly or modular deck includes a power supply switching circuit that switches available power from the power supply between the at least two common connectors, and a network switch that switches packet network traffic between the at least two common connectors.

In another aspect of the disclosure, a skid steered robot includes a set of driven flippers, each flipper being pivotable about a first pivot axis common with a drive axis of the chassis. A deck assembly, disposed above the chassis, includes a power supply, a packet network connection, a modular deck support structure, a deck wiring harness connector including packet network cabling and power cabling, and a modular deck. The modular deck includes a deck mount which fits the modular deck support structure, at least two externally available common connectors, a power supply switching circuit that switches available power from the power supply between at least two common connectors, a network switch that switches packet network traffic between the at least two common connectors, and a deck wiring harness that connects to the deck wiring harness connector and carries power and network to and from the modular deck.

In another aspect of the disclosure, a modular deck for a robotic vehicle includes a base configured to be secured to the vehicle, wherein the base receives both a power link and a communication link from the robotic vehicle. A platform configured to support a removable functional payload is secured to the base and has at least one connection point for both a functional payload power link and a functional payload communication link. The connection point is linked to both the base power link and the base communication link.

Another aspect of the disclosure provides a robotic vehicle that includes a chassis having front and rear ends and supported on right and left driven tracks, each track trained about a corresponding front wheel rotatable about a front wheel axis, and right and left elongated flippers disposed on corresponding sides of the chassis and operable to pivot about the front wheel axis of the chassis. Each flipper has a driven track about its perimeter. The robotic vehicle includes a deck assembly configured to receive a removable payload and a linkage connecting the deck assembly to the chassis. The linkage has a first end rotatably connected to the chassis at a first pivot, and a second end rotatably connected to the deck assembly at a second pivot. Both of the first and second pivots include independently controllable pivot drivers operable to rotatably position their corresponding pivots to control both fore-aft position and pitch orientation of the deck assembly with respect to the chassis. The linkage is a single unitary link connecting the deck assembly to the chassis. In some implementations, the linkage defines an interior passageway configured to receive cabling routed between the chassis and the deck assembly. In some of those implementations, the linkage further comprises an insulated electrical conductor extending along the enclosed interior passageway.

In some implementations, the first pivot is rotatable through an angle of at least 180 degrees. The independently controllable pivot drivers provide both fore-aft position and pitch orientation of the deck assembly with respect to the chassis to selectively displace a center of gravity of the deck assembly both forward and rearward of a center of gravity of the chassis. In some implementations, the first end of the linkage is rotatably connected near the front of the chassis, such that the deck assembly is displaceable to an aftmost position in which the deck assembly is located within a footprint of the chassis. The first pivot of the linkage is located above and forward of the front wheel axis, such that rotation of the linkage about its first and second pivots enables selective positioning of a center of gravity of the deck assembly both fore and aft the front wheel axis.

In some implementations, the deck assembly includes connection points for both a payload power link and a payload communication link. The deck assembly may be configured to receive a removable payload on top and bottom portions of the deck assembly. A controller recognizes the receipt and placement of the payload on the deck assembly. The chassis has a center of gravity between its front and rear ends. Each flipper has a pivot end, a distal end, and a center of gravity therebetween, and the linkage has a center of gravity between its first and second ends. The deck assembly has a leading end, and a trailing end, and a center of gravity therebetween. The second pivot can be disposed on the deck assembly substantially at a mid-point between the leading and trailing ends of the deck assembly. The linkage together with the deck assembly shifts between about 10% and about 50% of the vehicle weight, shifting a combined center of gravity of the vehicle between an aft center of gravity position intermediate the front and rear ends of the chassis and a fore center of gravity position intermediate the distal and pivot ends of the flippers.

The details of one or more implementations of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 1:
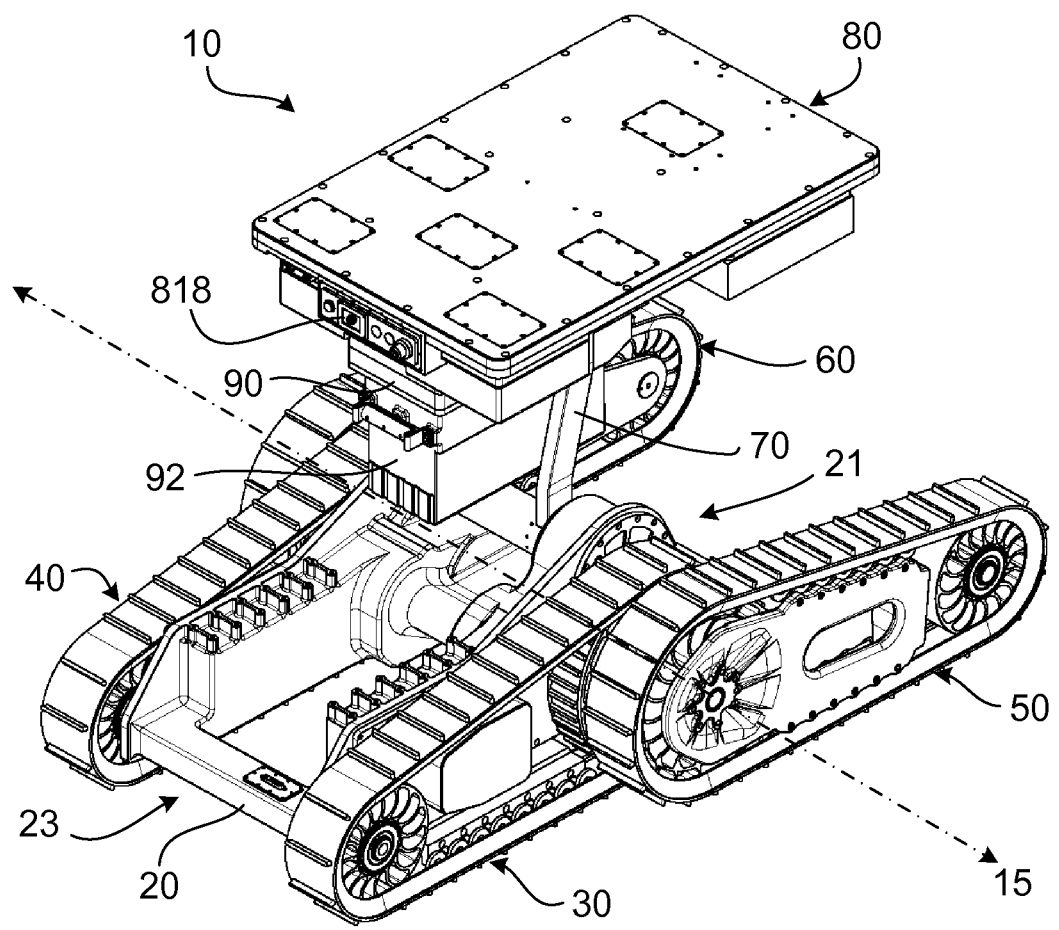
FIG. 1 is a perspective view of a robotic vehicle.
Figure 10:
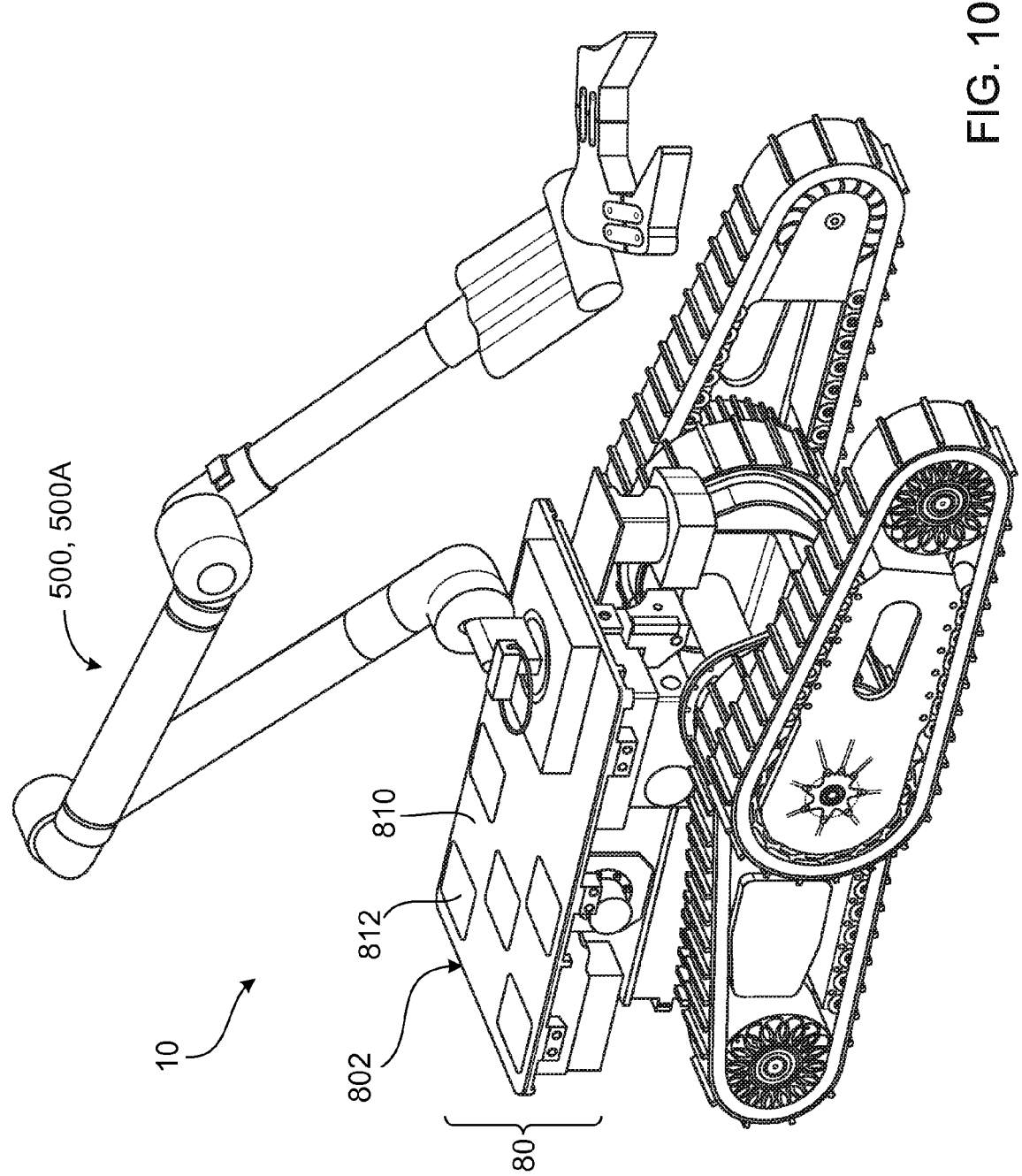
FIG. 10 is a perspective view of a robotic vehicle with a manipulator arm.
Figure 11:
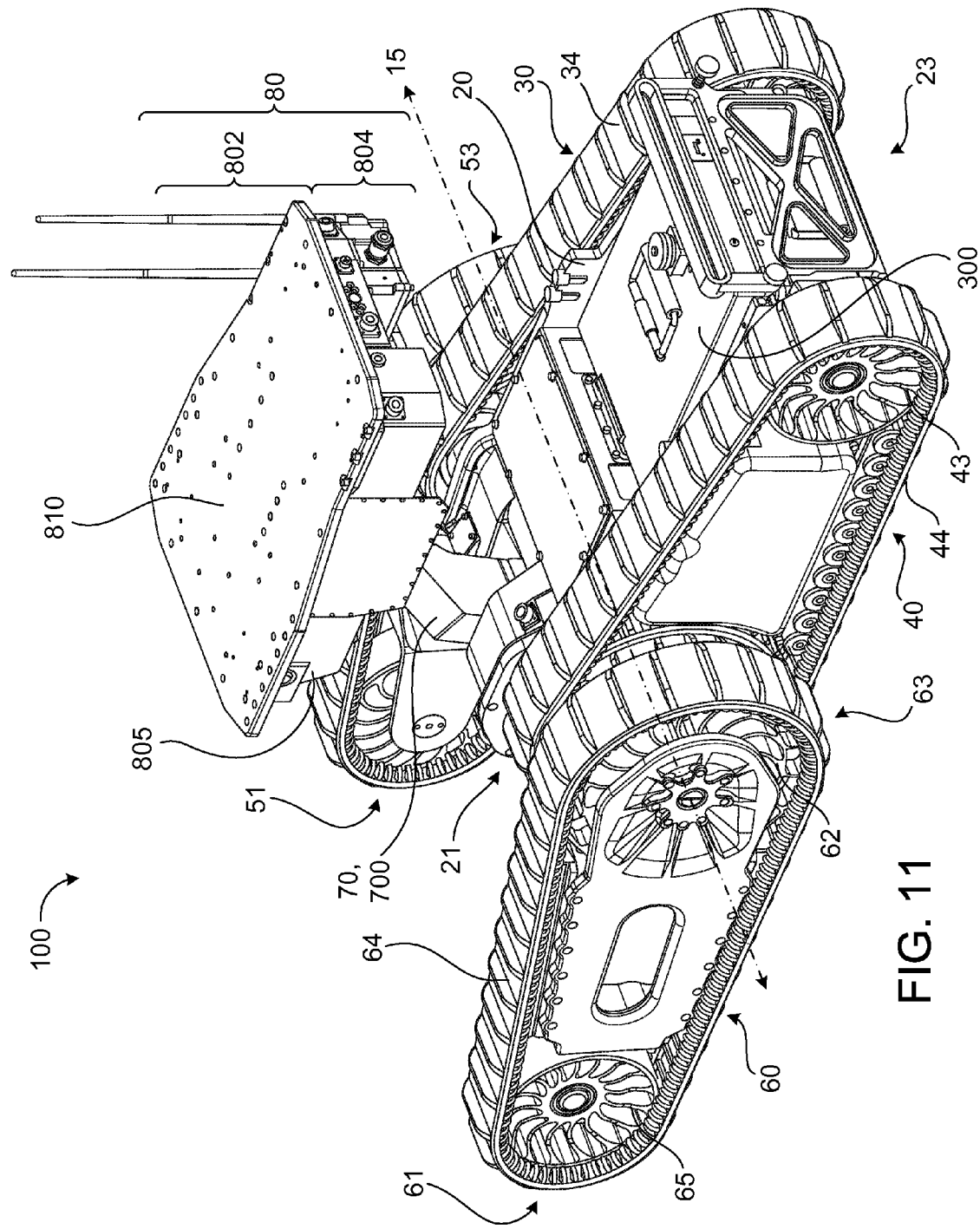
FIG. 11 is a perspective view of a robotic vehicle.
Figure 12:
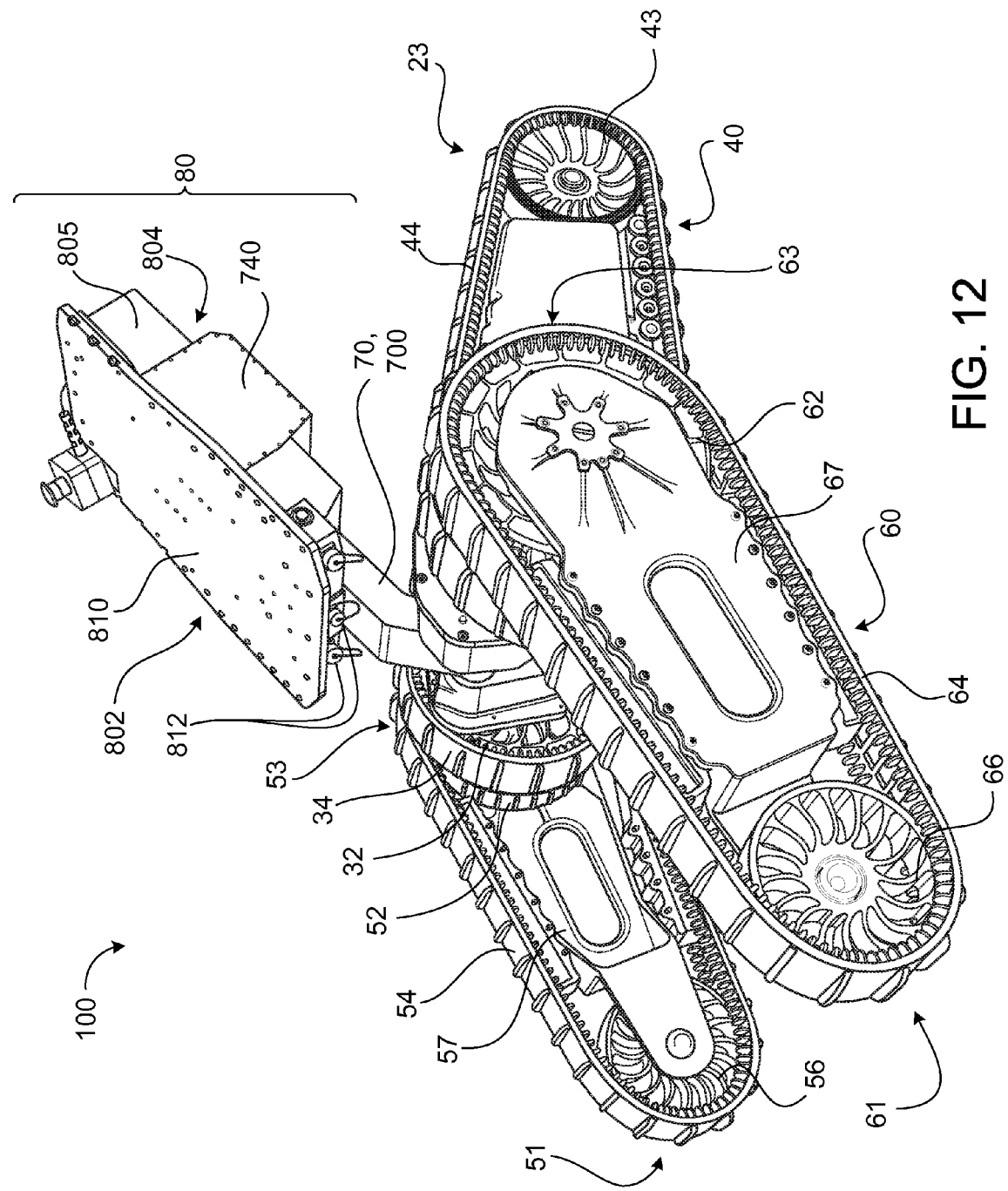
FIG. 12 is a front perspective view of the robotic vehicle shown in FIG. 11.

Referring to FIGS. 1 and 10, a robotic vehicle 10, 100, in some implementations, is a remotely operated vehicle that enables the performance of manpower intensive or high-risk functions (i.e., explosive ordnance disposal; urban intelligence, surveillance, and reconnaissance (ISR) missions; minefield and obstacle reduction; chemical/toxic industrial chemicals (TIC)/toxic industrial materials (TIM); etc.) without exposing operators directly to a hazard. These functions often require the robotic vehicle 10 to drive quickly out to a location, perform a task, and either return quickly or tow something back. The robotic vehicle 10 is operable from a stationary position, on the move, and in various environments and conditions.

Referring to FIGS. 1-7 and 11-14, the robotic vehicle 10, 100 includes a chassis 20 having front and rear ends 21, 23 and is supported on right and left drive track assemblies 30, 40 having corresponding driven tracks 34, 44. Each driven track 34, 44 is trained about a corresponding front wheel 32, 42, which rotates about a front wheel axis 15, and rear wheels 33, 43. Right and left flippers 50, 60 (also referred to as front arms) are disposed on corresponding sides of the chassis 20 and are operable to pivot about the front wheel axis 15 of the chassis 20. Each flipper 50, 60 has a corresponding driven track 54, 64 about its perimeter that is trained about a respective rear wheel 52, 62, which rotates about the front wheel axis 15 and distal wheels 56, 66. In the example shown, each flipper 50, 60 has a distal end 51, 61 and a pivot end 53, 63, with the rear wheel 52, 62 disposed on respective side arms 57, 67 at the pivot end 53, 63 of the flipper 50, 60 and the distal wheel 56, 66 disposed at the distal end 51, 61 of the flipper 50, 60. The flippers 50, 60 may be disposed on a side of the drive track assemblies 30, 40 that is opposite of the chassis 20 (e.g., out-board). The flippers 50, 60 can rotate fully through 360° about the front wheel axis 15.

Figure 7:
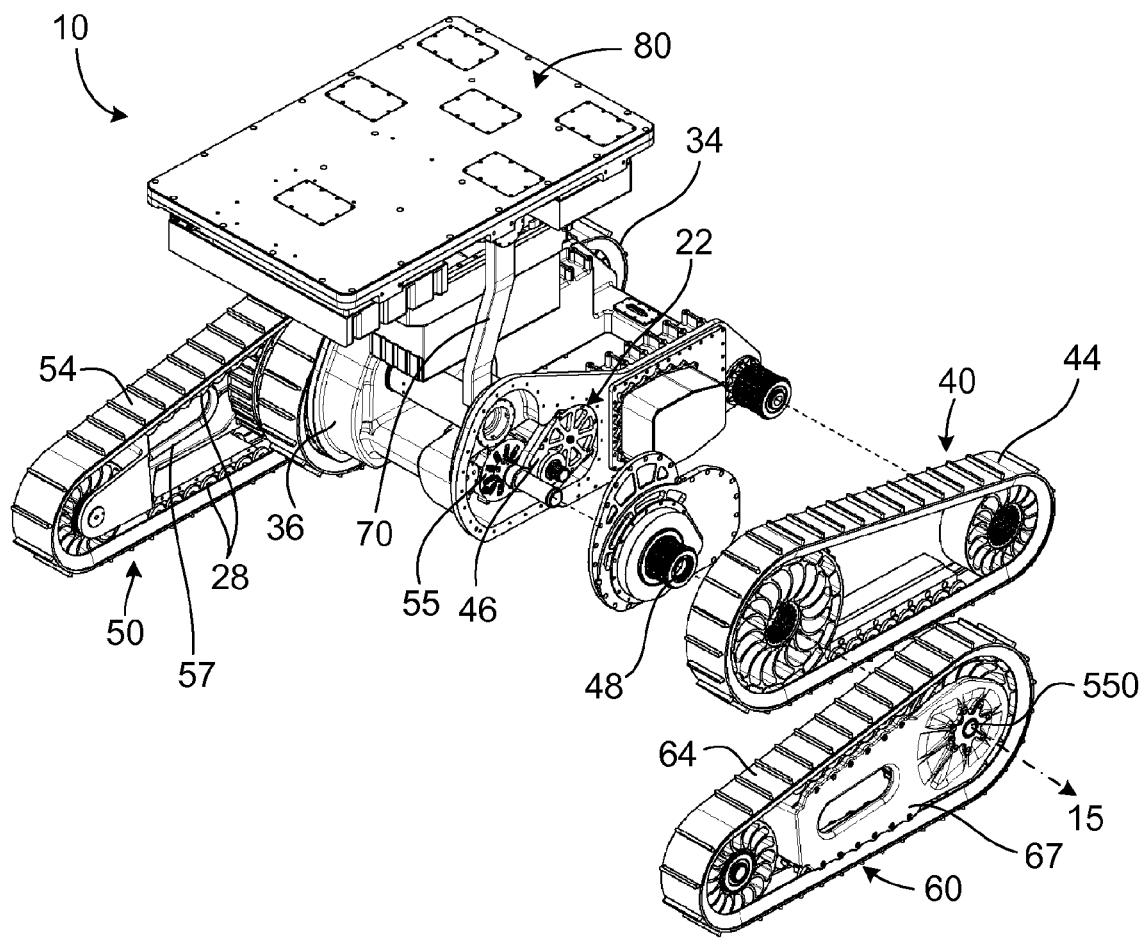
FIG. 7 is an exploded perspective view of the robotic vehicle shown in FIG. 1.
Figure 8:
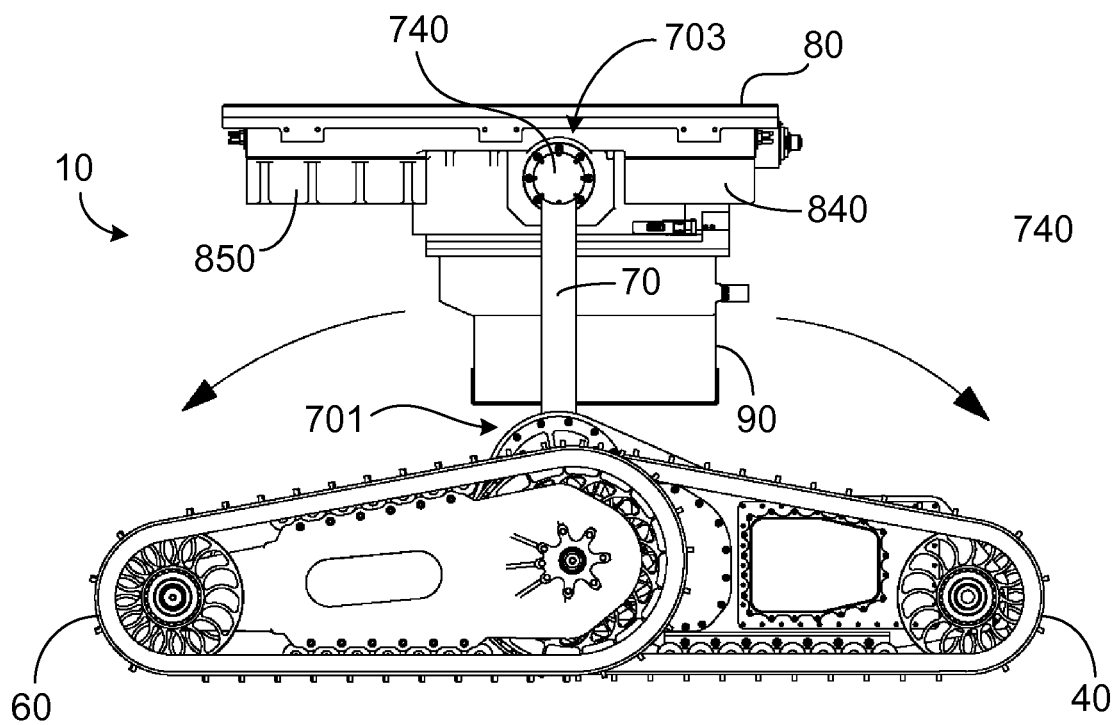
FIG. 8 is a side view of the robotic vehicle shown in FIG. 1.
Figure 13:
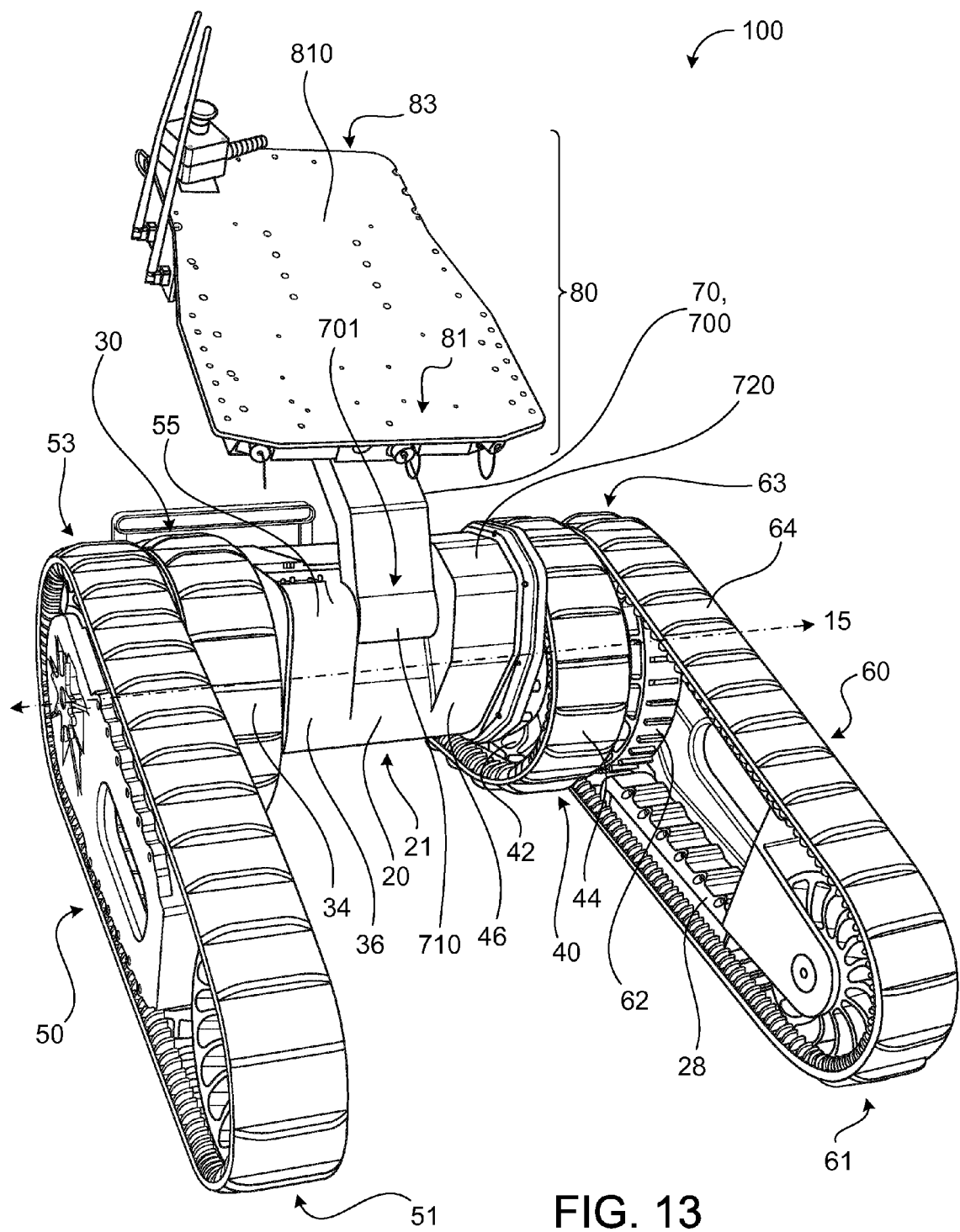
FIG. 13 is a rear perspective view of the robotic vehicle shown in FIG. 11.
Figure 14:
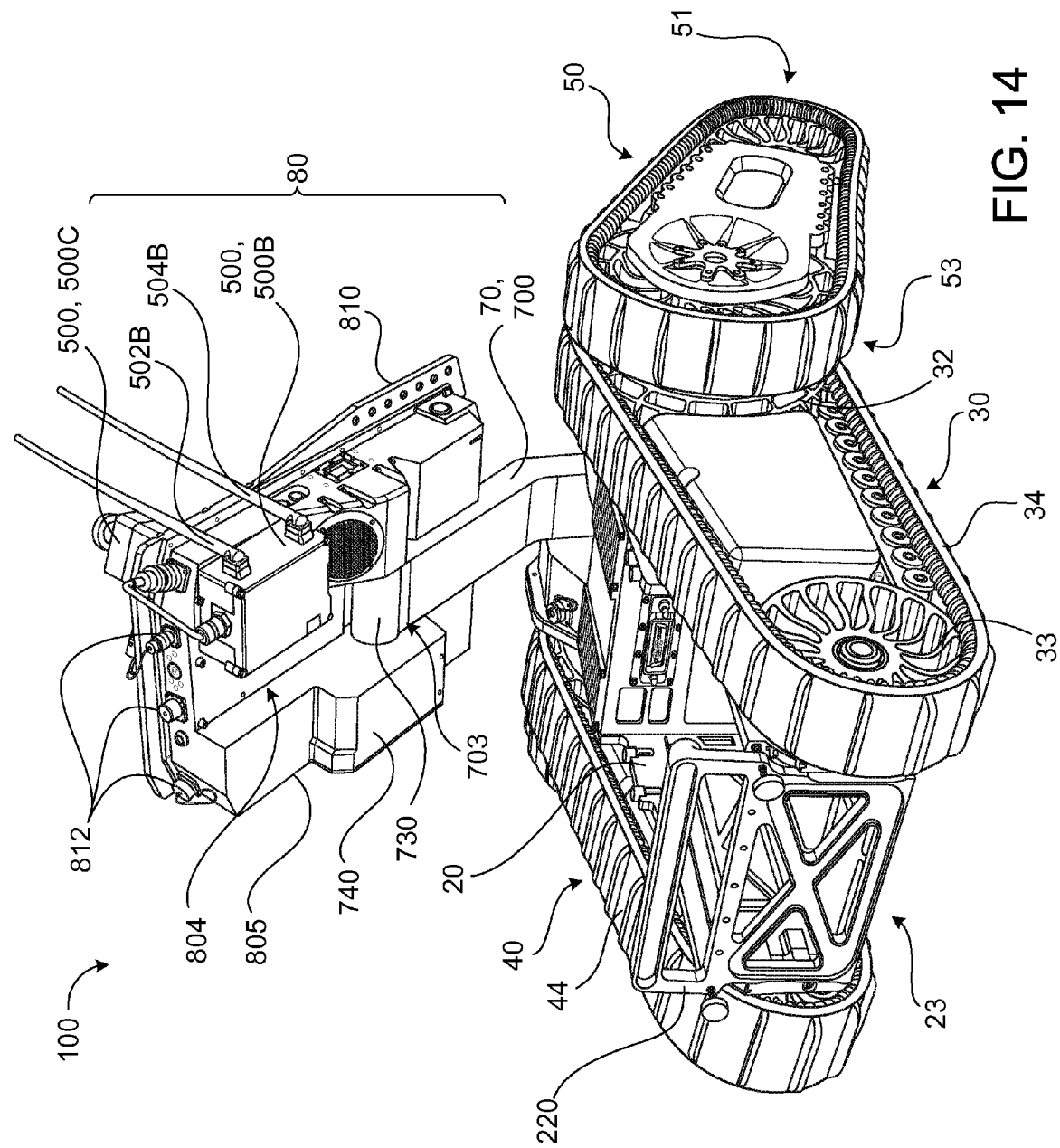
FIG. 14 is a rear perspective view of a robotic vehicle.

FIG. 7 provides an exploded view of one exemplary robotic vehicle 10; however other implementations, such as the one shown in FIG. 13, may include the same or similar arrangement of drive and actuation components. The robotic vehicle 10, 100 includes right and left motor drivers 36, 46 driving corresponding drive tracks 34, 44 and flipper tracks 54, 64, which are supported between their front and rear ends by bogie wheels or track supports 28. In some examples, the right and left motor drivers 36, 46 are operatively coupled to the respective front wheels 32, 42 of the right and left drive track assemblies 30, 40 to drive the respective tracks 34, 44. A flipper actuator module 55 is supported by the chassis 20 and is operable to rotate the flippers 50, 60. In some examples, the flippers 50, 60 are actuated in unison. In other examples, the flippers 50, 60 are actuated independently by right and left flipper actuators 55. The rear wheel 52, 62 of each flipper 50, 60 may be operatively coupled to the right and left motor drivers 36, 46 to drive the flipper tracks 54, 64 in unison with the drive tracks 34, 44.

Figure 2:
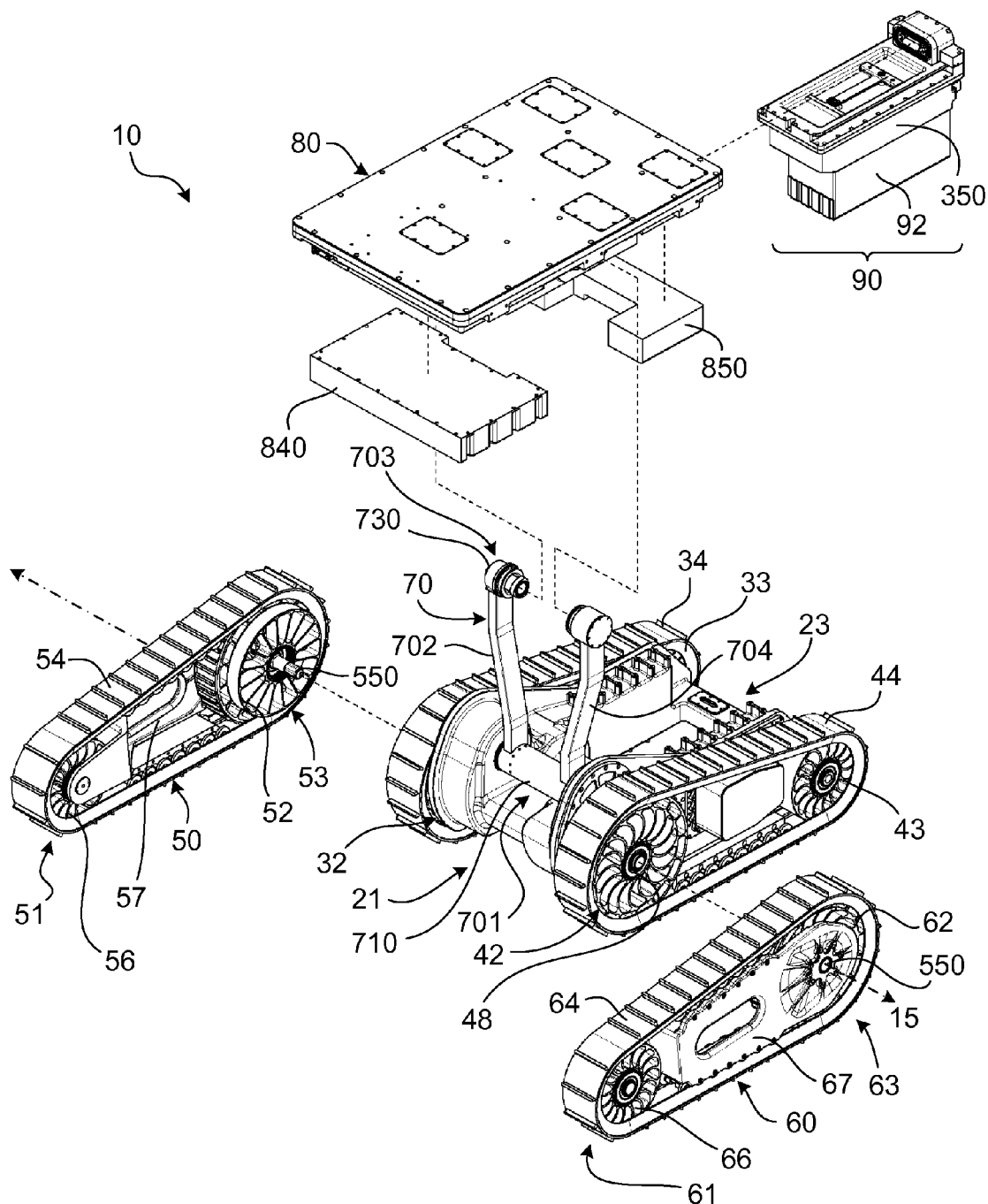
FIG. 2 is an exploded view of the robotic vehicle shown in FIG. 1.
Figure 3:
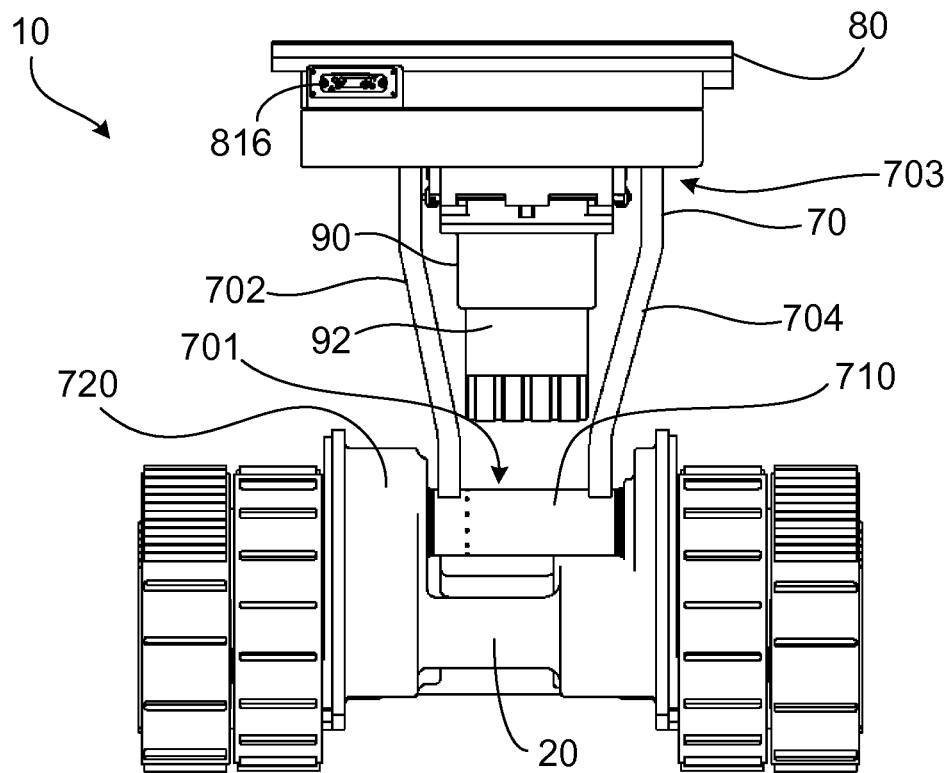
FIG. 3 is a front view of the robotic vehicle shown in FIG. 1.
Figure 4:
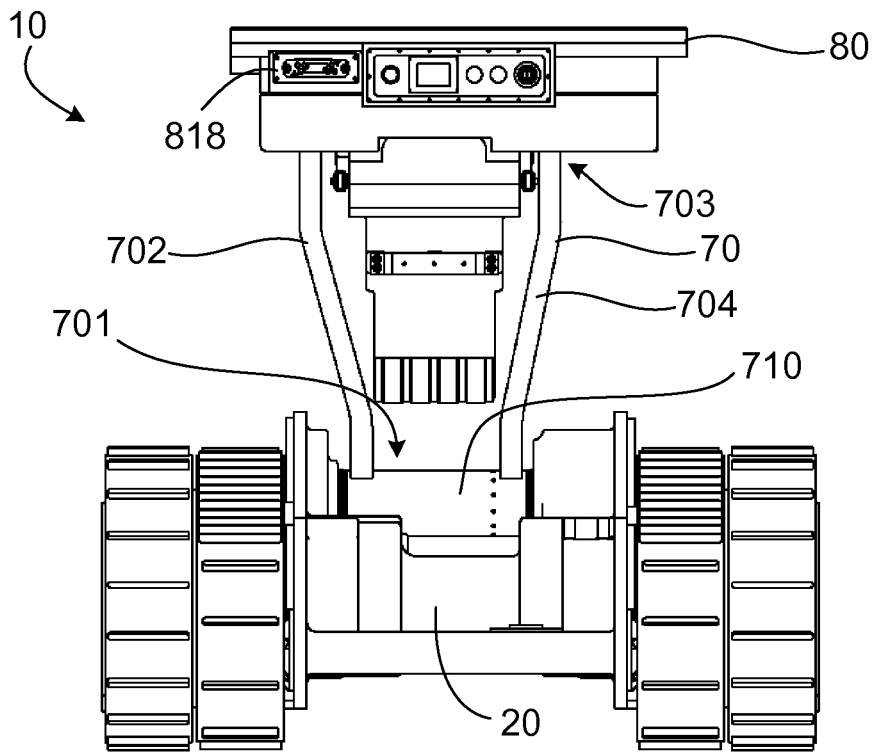
FIG. 4 is a back view of the robotic vehicle shown in FIG. 1.

Referring to FIGS. 2-4, 8 and 11-14, a linkage 70 connects a deck assembly 80 to the chassis 20. The deck assembly 80 is configured to support a removable functional payload 500. The deck shifter 70 is also referred to as a center of gravity (CG) shifter and, as in the example shown, may be implemented as a linkage 70. In some implementations, the linkage 70 has a first end 701 rotatably connected to the chassis 20 at a first pivot 710, and a second end 703 rotatably connected to the deck assembly 80 at a second pivot 730. Both of the first and second pivots 710, 730 include respective independently controllable pivot drivers 720, 740 operable to rotatably position their corresponding pivots 710, 730 to control both fore-aft position and pitch orientation of the deck assembly 80 with respect to the chassis 20. The deck assembly 80 has leading and trailing ends 81, 83 (FIGS. 3 and 4). In the examples shown in FIGS. 3 and 4, the linkage 70 includes two parallel links 702, 704 spaced apart laterally. In the example shown in FIGS. 11-14, the linkage 70 includes a single unitary link or neck 700 that connects the chassis 20 to the deck assembly 80. Communication lines (e.g., electric cabling, wires, etc.) between the chassis 20 and the deck assembly 80 may be routed though an interior passageway of the linkage 70, 700. In some examples, the interior passageway has a cross-sectional volume of at least about 2 in$^2$ (preferably about 4 in$^2$).

Figure 9:
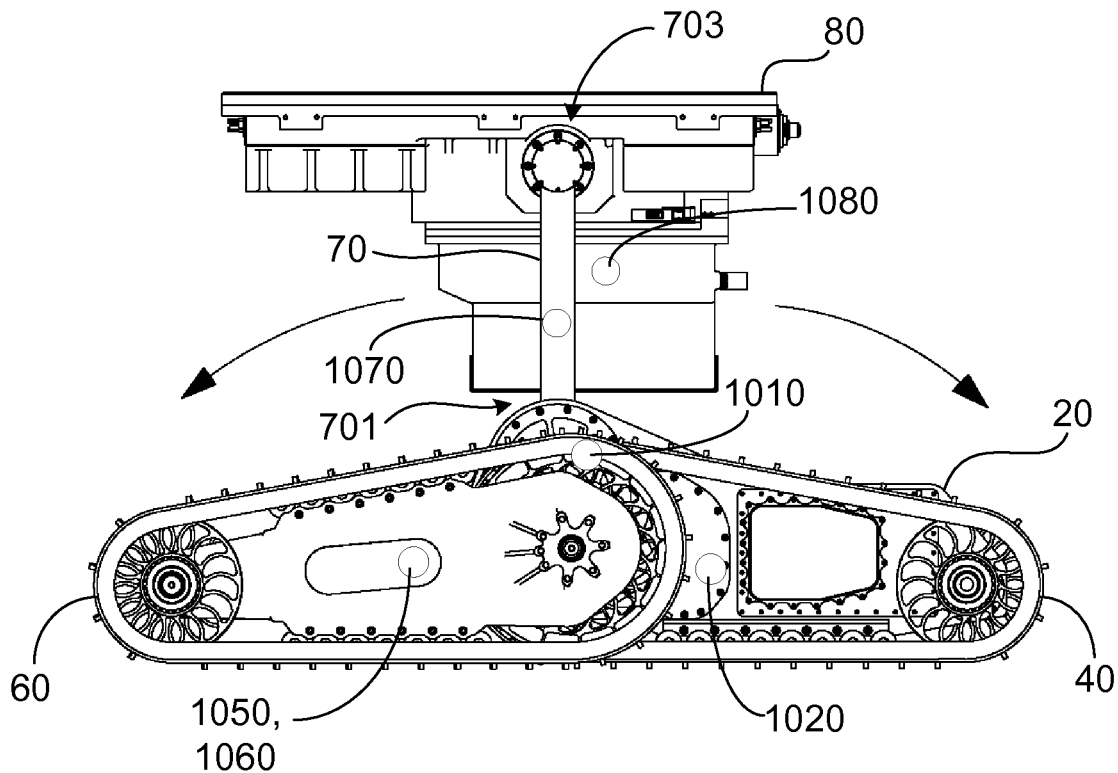
FIG. 9 is a side view of a robotic vehicle showing centers of gravity of the vehicle.

Referring to FIG. 9, the chassis 20 has a center of gravity 1020 between its front and rear ends 21, 23. In some examples, the chassis 20 weighs about 187 lbs. Each flipper 50, 60 has a center of gravity 1050, 160 between its distal end 51, 61 and its pivot end 53, 63. In some examples, each flipper 50, 60 weighs about 25 lbs. The linkage 70 has a center of gravity 1070 between its first and second ends 701, 703; and the deck assembly 80 has a center of gravity 1080 between its leading and trailing ends 81, 83. In some examples, the deck assembly 80 weighs about 45 lbs. In some examples, the deck assembly 80 constitutes between about 30 and 70 percent of the vehicle's total weight (depending on the weight of a received payload 500). In other examples, the deck assembly 80 without any payloads 500 constitutes between about 5 and 50 percent of the vehicle's total weight (preferably about 13 percent). The robotic vehicle 10, 100 may have an overall weight of about 340 lbs. In some implementations, to aid shifting of the overall center of gravity 1010 of the robotic vehicle 10, 100, the second pivot 730 disposed on the deck assembly 80 substantially at a mid-point between the leading and trailing ends 81, 83 of the deck assembly 80. The first end 701 of the linkage 70 is rotatably connected near the front of the chassis 20 such that the deck assembly 80 is displaceable to an aftmost position in which the deck assembly 80 is located within a footprint of the chassis 20. Furthermore, as shown in FIGS. 1, 2, 12 and 13, the first pivot 710 of the linkage 70 is located above and forward of the front wheel axis 15. The first pivot 710 is rotatable through an angle of at least 180 degrees (optionally, 74 degrees), in some examples. Rotation of the linkage 70 about its first and second pivots, 710 and 730 respectively, enables selective positioning of a center of gravity 1080 of deck assembly 80 both fore and aft front wheel axis 15 as well as both fore and aft a center of gravity 1020 of the chassis 20. In another example, the independently controllable pivot drivers 720, 740 provide both fore-aft position (as part of sweep) and pitch orientation of the deck assembly 80 with respect to the chassis 20 to selectively displace the center of gravity 1080 of the deck assembly 80 both forward and rearward of the center of gravity 1020 of the chassis 20, displacing a center of gravity 1010 of the entire robotic vehicle 10, 100.

Figure 15:
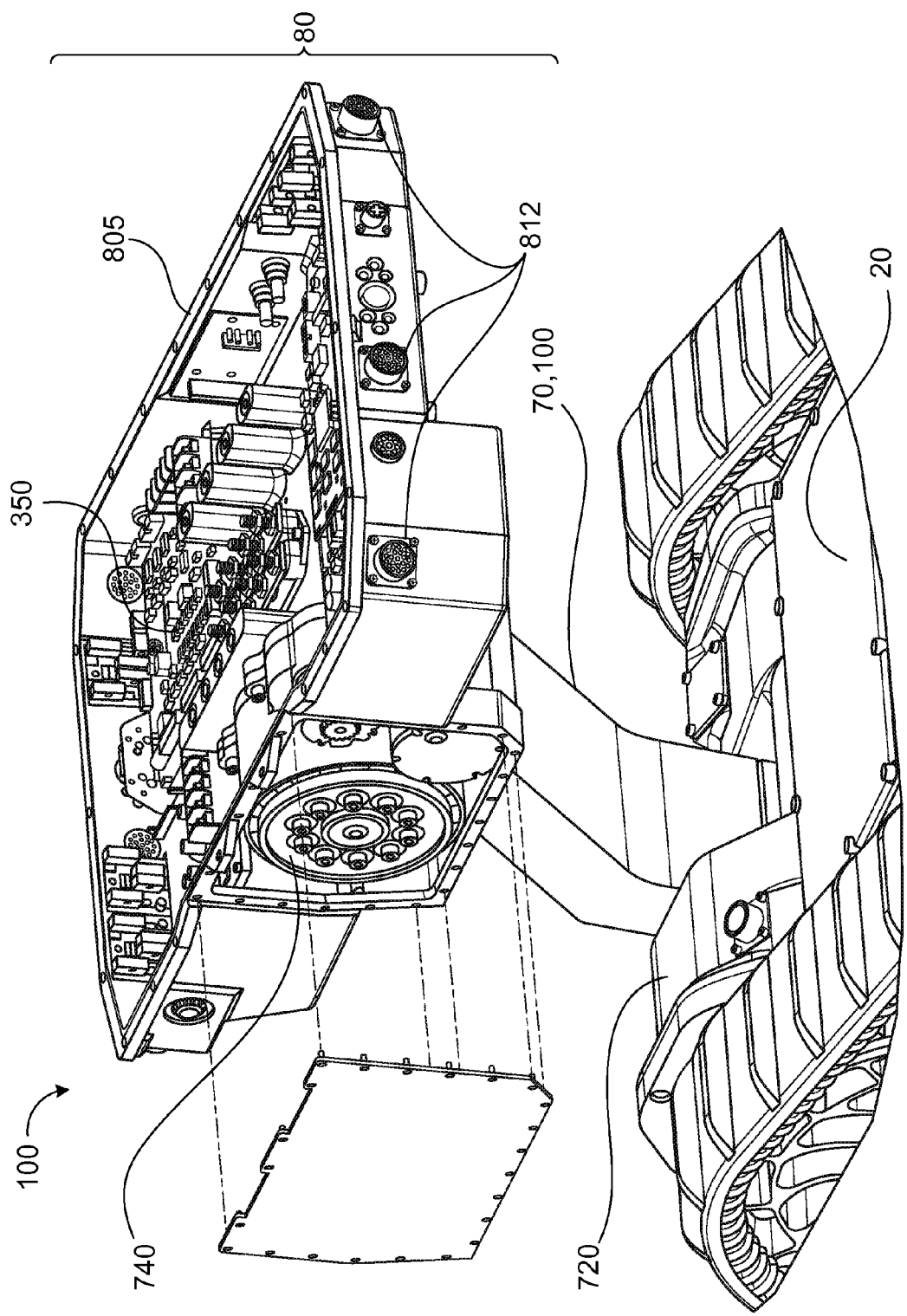
FIG. 15 is a perspective view of linkage connecting a deck assembly to a chassis of a robotic vehicle.

The robotic vehicle 10, 100 includes a controller unit 350 (FIGS. 2 and 15) (optionally removable) operably connected to a drive system (e.g. the motor drivers 36, 46) of the chassis 20, the first and second pivot drivers 720, 740, and optionally any received payload 500 (via one or more of the connection points 812). In some examples, the controller 350 is housed in an electronics bin 90 or deck base 805 of the deck assembly 80. In other examples, the controller 350 is disposed on the chassis 20. The robotic vehicle 10, 100 may sense elements of balance through the linkage 70 (e.g., via motor load(s), strain gauges, and piezoelectric sensors), allowing an operator or autonomous dynamic balancing routines to control the center of gravity 1080 of the deck assembly 80 and a center of gravity 1070 of the linkage 70 for enhanced mobility, such as to avoid tip over while traversing difficult terrain.

A straight shaft may join both flippers 50,60 directly, allowing the first pivoting actuator 720 to be placed off center with the flipper actuator 55. Additional pivot range past 180 degrees may be obtained, as with additional standing height, by increasing the distance between the first pivot 710 and the front wheel axis 15 (also known as the flipper-chassis joining axis).

If positioned concentrically with the front wheel axis 15, the linkage rotation range could be 360 degrees. Other constraints designed herein and other advantages obtainable in other positions can change this. For example, if the first pivot 710 of the linkage 70 is positioned above and forward of the common chassis-flipper axis 15 (e.g., about 20 mm forward and about 70 mm above), it is possible to have a unitary structure for the chassis 20 (casting). Other systems may have a range of considerably less than 180 degrees, for example if the parts of such systems are limited in a pivoting or movement range by interference among the system members. Still further, the linkage 70 can have a relatively longer effective forward extending range, since the linkage 70 is substantially stowable to the chassis 20. The distance between more than one chassis connections of the other systems may shorten the effective forward extending range. As one additional advantage, a second, deck-side actuator 740 of the linkage 70 can be used to "nod" (auxiliary scan) a scanning (main scanning) sensor such as a 2D LADAR or LIDAR to give a 3D depth map.

Figure 16:
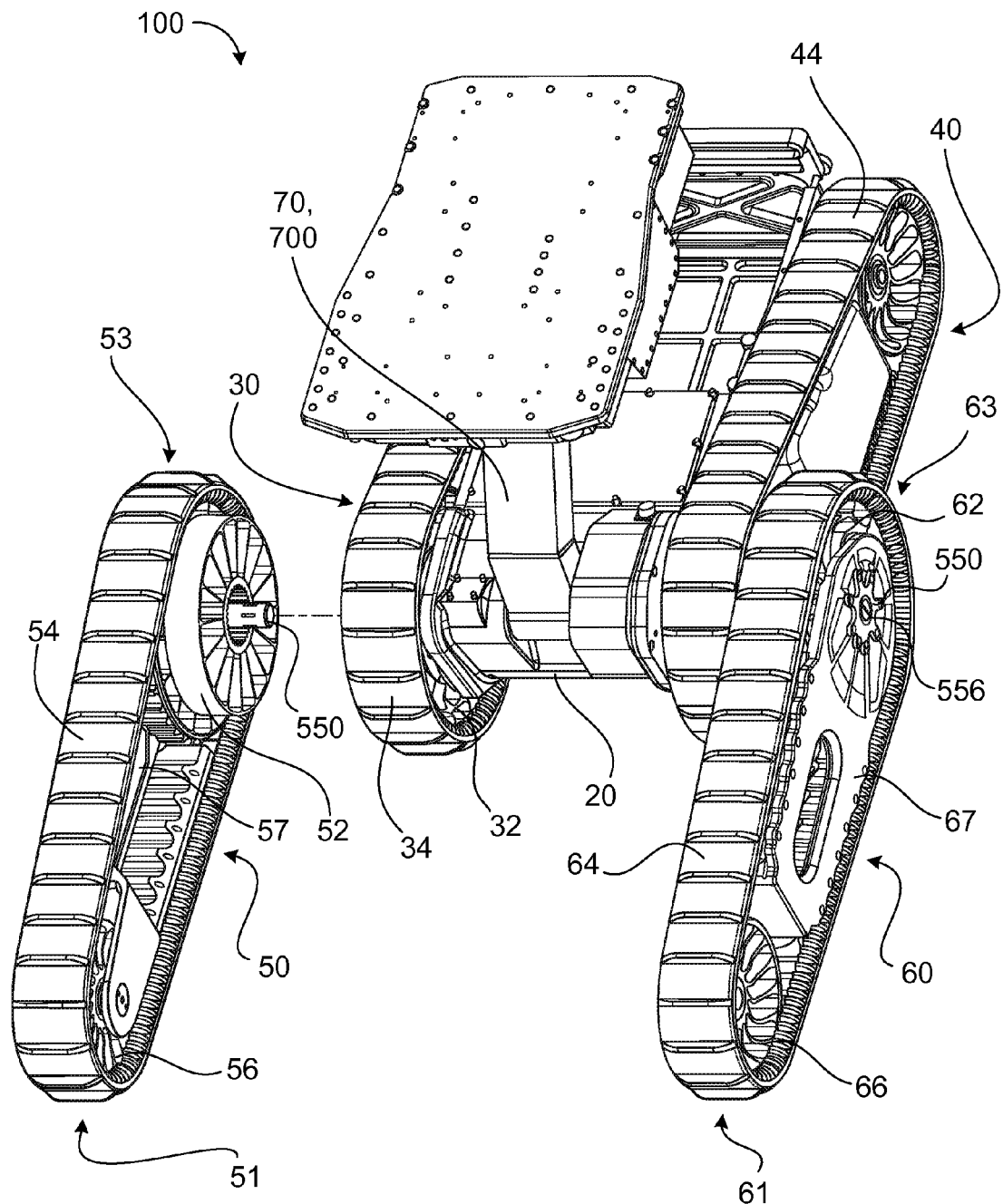
FIG. 16 is a top perspective view of a flipper detachably received by a robotic vehicle.
Figure 17:
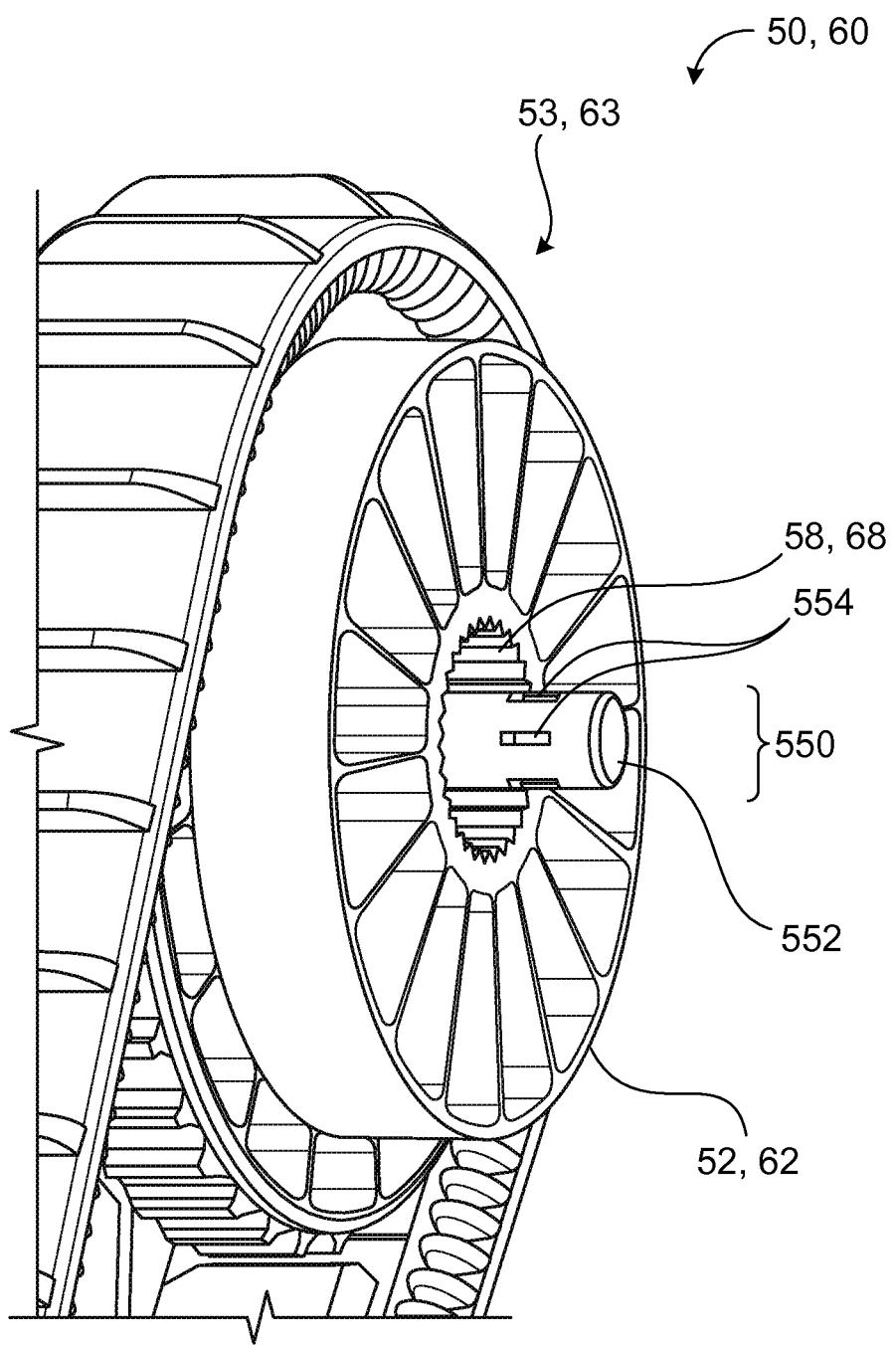
FIG. 17 is a perspective view of a pivot end of a flipper having a tool-less connector.
Figure 18:
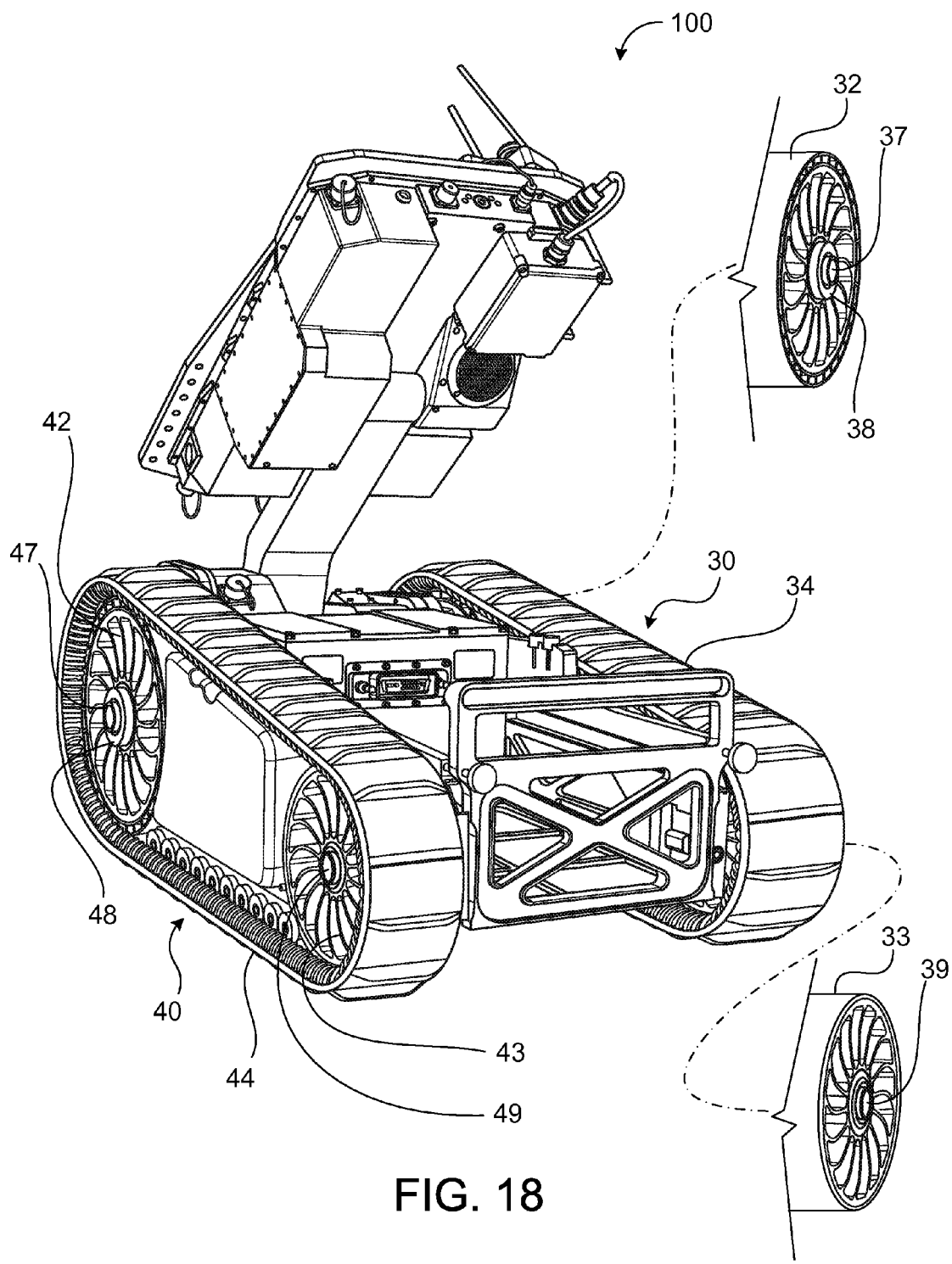
FIG. 18 is a rear perspective view of a robotic vehicle without flippers.

Referring to FIGS. 2, 7 and 16-18, in some implementations, the robotic vehicle 10, 100 includes removable flippers 50, 60. (FIG. 16 illustrates the robotic vehicle 100 with flippers 50,60 and FIG. 18 illustrates the robotic vehicle 10, 100 without flippers 50,60.) In some examples, the chassis 20 weighs about 237 lbs with flippers 50, 60 and about 187 lbs without flippers 50, 60. Each flipper 50, 60 is removably attached to the chassis 20 and/or respective drive track assembly 30, 40 by rotatably connecting the respective rear wheel 52, 62 of the flipper 50, 60 to the chassis 20 so as to rotate about the front wheel axis 15. In some examples, the flippers 50, 60 are secured to the chassis 20 and/or respective drive track assembly 30, 40 by a tool-less connector 550 (e.g., a fastener that may be secured by hand and does not require conventional tools, such as wrenches, to fasten in place). The tool-less connector may be a wing nut, a locking pin, spring loaded detent feature in a receptacle for a shaft of the rear wheel 52, 62. In some examples, the front wheels 32, 42 of the right and left drive track assemblies 30, 40 each include a drive translation feature 38, 48 (e.g., teeth, gear, receptacle, mating feature) that mates with a corresponding drive translation feature 58, 68 of the rear wheels 52, 62 of the flippers 50, 60. When the flippers 50, 60 are releasably attached to the chassis 20 and/or respective drive track assembly 30, 40, the drive translation features 58, 68 of the rear wheels 52, 62 of the flippers 50, 60 mate with or engage the corresponding drive translation features 38, 48 of the front wheels 32, 42 of the right and left drive track assemblies 30, 40, thereby allowing the flipper tracks 54, 64 to be driven in unison with the drive tracks 34, 44.

The tool-less connector 550 includes a shaft 552 having retractable pawls 554 dispersed radially about the shaft 552. The pawls 554 retract into the shaft 552 upon actuation of an actuator 556 (e.g., button) of the tool-less connector 550, which is accessible on a side of the flipper 50, 60 opposite of the chassis 20. The shaft 552 and pawls 554 are received by a shaft receptacle 37, 47 of the corresponding drive wheel 32, 42 that is coupled to the flipper actuator 55. The tool-less connector shaft 552 operates as an axle for the rear wheels 52, 62 of the flippers 50, 60 and are rigidly coupled to the respective side arms 57, 67 (e.g., plates) of the of the flippers 50, 60. The pawls 554 are received by corresponding holding features defined by the shaft receptacles 37, 47 and translate rotation of the flipper actuator 55 to the tool-less connector shaft 552 and the side arms 57, 67 of the of the flippers 50, 60. The pawls 554, in some examples, define a rectangular cross-sectional shape. The tool-less connector 550 allows for quick removal of the flippers 50, 60, for example, to access the tracks 34, 44 for servicing of the right and left drive track assemblies 30, 40 (e.g., to change out one or both of the tracks 34, 44). The robotic vehicle 10, 100 may be operated without flippers 50, 60, as shown in FIG. 18, and when need, the flippers 50, 60 can be quickly and easily attached, as shown in FIG. 16, by sliding the tool-less connector shaft 552 of each flipper 50, 60 into and engaging (e.g., via the pawls 554) the respective shaft receptacle 37, 47 of the corresponding drive wheel 32, 42, thereby coupling the flippers 50, 60 to the robotic vehicle 10, 100. The tool-less connector 550 (including the pawls 552) can transfer enough torque to support the weight of the robotic vehicle 10, 100 (e.g., 340 lbs) on the flippers 50, 60. In some examples, the tool-less connector 550 (including the pawls 552) can transfer at least 300 ft-lbs of torque (preferably at least 680 ft-lbs) through its shaft 552 and pawls 554 to the respective flipper 50, 60. In some examples, the flippers 50, 60 can be removed from the robotic vehicle 10, 100 for attachment of wheels (not shown) to operate the robotic vehicle 10, 100 in a wheeled mode. In this scenario, wheels each having a tool-less connector 500 (and rotating about the shaft 552) can be connected to the shaft-receptacles 37, 39, 47, 49 of the corresponding wheels 32, 33, 42, 43 of the chassis 20. Drive wheels would have the drive translation features 58, 68 to be driven in unison with the corresponding front drive wheels 32, 42 of the right and left drive track assemblies 30, 40.

Referring again to FIGS. 1, 5 and 11-14, the deck assembly 80 includes a payload deck 810 configured to receive and support one or more removable functional payloads 500 (various implementations of the payload deck 810A, 810B, 810C are shown other drawings herein). The functional payloads or modules 500 may include robotic arms 500A (as shown in FIG. 10), chemical, biological and radiation detectors, and a sample container. The robotic vehicle 10 automatically detects the presence and type of an installed functional payload 500 upon start-up. In some implementations, the deck assembly 80 includes one or more connection points or pads 812 for providing both a payload power link and a payload communication link to a received payload 500. Each functional payload connection point or pad 812 delivers power, ground and communications to a functional payload unit 500. For example, robotic vehicle 10 may provide up to 300 W (threshold), 500 W (goal) of power to a payload 500 at 42V, up to 18 A. The communication link may include Ethernet link communications. Details on communicating with a peripheral device over a network as well other details and features combinable with those described herein may be found in U.S. patent application Ser. No. 11/748,363, filed May 14, 2007, the entire contents of which are hereby incorporated by reference. The payload connection points or pads 812 may be positioned to accommodate selective connection of multiple payloads 500 to the deck assembly 80. In the examples shown in FIGS. 2-6, the payload deck 810 includes one or more connection points or pads 812 for receiving and/or providing electrical communication to a functional payload 500. In those examples, the deck assembly 80 includes a removable electronics bin 90, which houses the controller 350. The deck assembly 80, or in some examples, the payload deck 810, may have a wide substantially the same width as the chassis 20 or at least as wide as the chassis 20. Having a deck assembly 80 or payload deck 810 substantially the same width or at least as wide as the chassis 20 allows the robotic vehicle 10, 100 to have a relatively large area for receiving one or more payloads 500. The robotic vehicle 10, 100 can function as a hauling vehicle or carry loads that would be otherwise unmanageable by a person.

In the examples shown in FIGS. 11-14, the deck assembly 80 includes one or more connection points or pads 812 disposed on a deck base 805 that receives the payload deck 810. The deck assembly 80 shown can receive functional payloads 500 on an upper portion 802 of the deck assembly 80 that includes the payload deck 810 and a lower portion 804 of the deck assembly 80 that includes the deck base 805. The controller 350 recognizes the receipt and placement of the payload 500 on the deck assembly 80 (e.g., via communication with one of the connection points 812). The controller 350 may execute a program (stored in memory thereon or communicated thereto) that identifies the received payload 500 and from the payload identification knows the size, weight, possibly range of movement, and/or other specifications of the payload to implement collision avoidance routines. For example, the payload 500 may communicate the payload specific data to the controller 350 upon placement or recognition thereof on the deck assembly 80, or the controller 350 may retrieve the payload specific data from memory or a connected source (e.g., wireless communication to a data source). The collision avoidance routines may be configured to prevent not only collision of the received payload with obstacles, but also self-collision with the robotic vehicle 10, 100 (e.g., as for a manipulator arm 500A).

FIG. 10 illustrates a robotic arm module 500A as a functional payload 500 attached to the upper portion 802 of the deck assembly 80. The robotic arm module 500A provides full hemispherical reach (or more, limited only by interference; or less, limited by other needs of the robot 10) around the robotic vehicle 10. The robotic arm module 500A provides lifting capacity and an additional means for shifting the robotic vehicle's center of gravity 1010 forward, e.g. when ascending steep inclines, and rearward, e.g. for additional traction.

Referring again to FIG. 14, in some implementations, the robotic vehicle 10, 100 includes a operator control unit (OCU) in communication (e.g., physical link, tether, wireless, etc.) with the controller 350, for example, through an optional communication functional payload module(s) 500B. The OCU allows a user to remotely control the robotic vehicle 10, 100. An exemplary OCU as well as other details and features combinable with those described herein may be found in a U.S. patent application Ser. No. 12/058,113, filed on Mar. 28, 2008, the entire contents of which are hereby incorporated by reference. The radio functional payload module 500B is received by the lower portion 804 of the deck assembly 80 on the deck base 805 and connected to connection point 812. The radio functional payload module 500B may include first and second emergency communication units 502B, 504B in communication with the OCU and/or the user. The first emergency communication unit 502B is in communication with the battery unit 92, 300 and is configured to receive an emergency stop signal (e-stop signal). In response to the e-stop signal, the first emergency communication unit 502B cuts all power to the robotic vehicle 10, 100, thereby fully disabling the robotic vehicle 10, 100 until power is restored. An e-stop switch 500C may be disposed on the robotic vehicle 10, 100 for physical activation and deliverance of the emergency stop signal to the first emergency communication unit 360. The e-stop feature is a security measure used to shut off the robotic vehicle 10, 100 in an emergency situation in which it cannot be shut down in a usual manner. Unlike a normal shut down, which shuts down all systems naturally and turns the machine off without damaging it, the e-stop feature is designed to completely abort any active operations (at all costs) and fully stop the robotic vehicle 10, 100. In some examples, power is restored by physically re-activating the robotic vehicle 10, 100, as by a switch, electrical breaker, etc. The second emergency communication unit 504B is configured to receive a controlled stop signal (c-stop signal) and in response to that signal, stop and shut-down the robotic vehicle 10, 100 in a controlled manner. For example, if the robotic vehicle 10, 100 is driving, decelerate the robotic vehicle 10, 100 to a stopped position, execute any shut-down routines (e.g., to save data, preserve state, etc.) and power off the robotic vehicle 10, 100.

Figure 19:
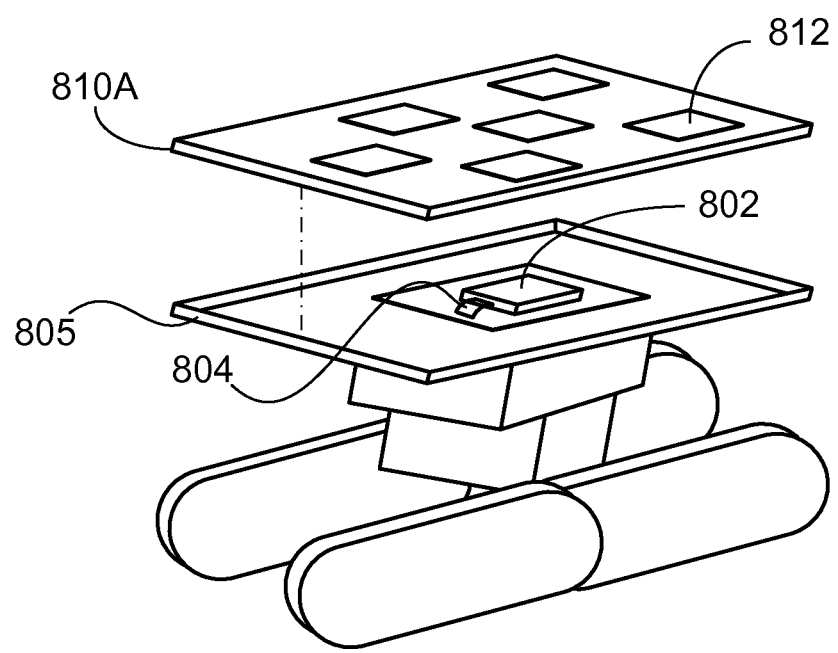
FIG. 19 is a perspective view of a robotic vehicle deck assembly that receives modular decks.
Figure 20:
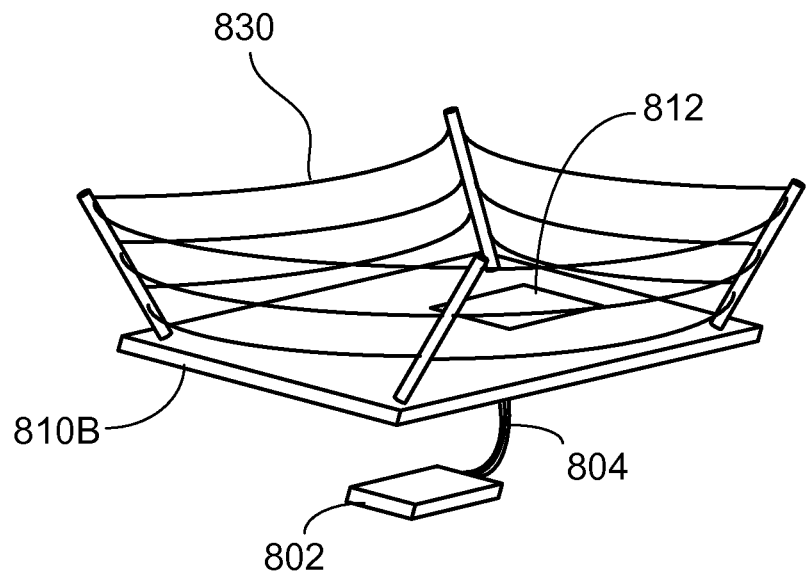
FIG. 20 is a perspective view of a robotic vehicle deck assembly having netting to receive and carry a payload.
Figure 21:
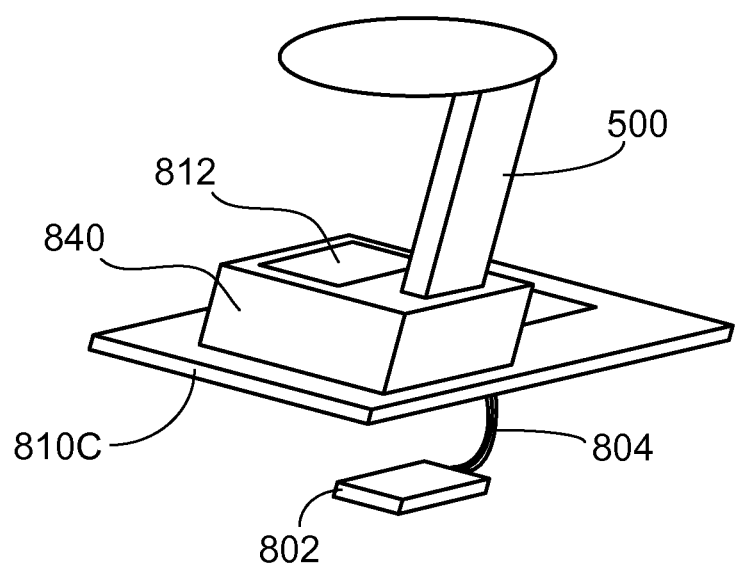
FIG. 21 is a perspective view of a robotic vehicle deck assembly with a payload received on a modular deck.
Figure 22:
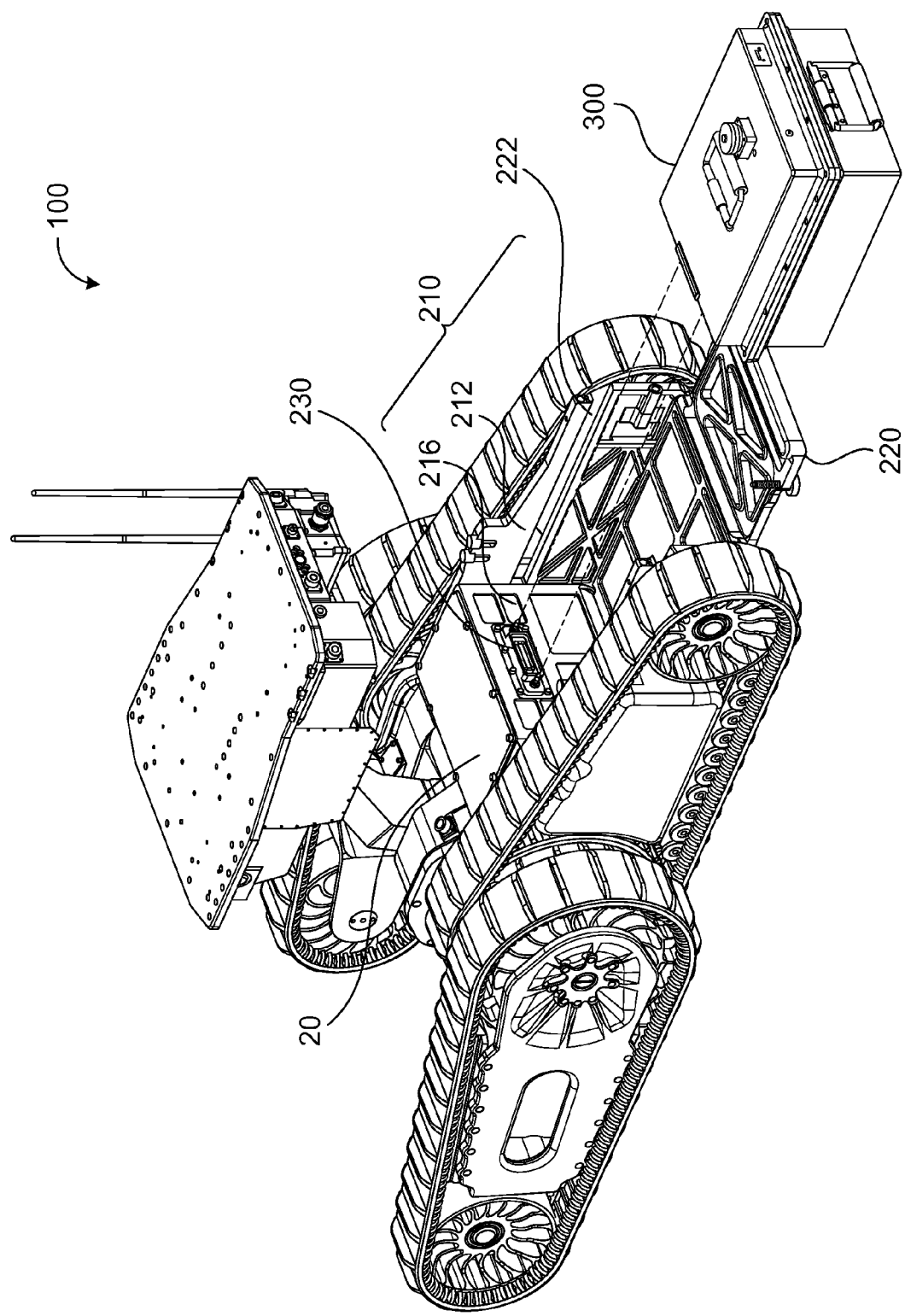
FIG. 22 is a rear perspective view of a robotic vehicle having a battery holder receiving a battery unit.
Figure 23:
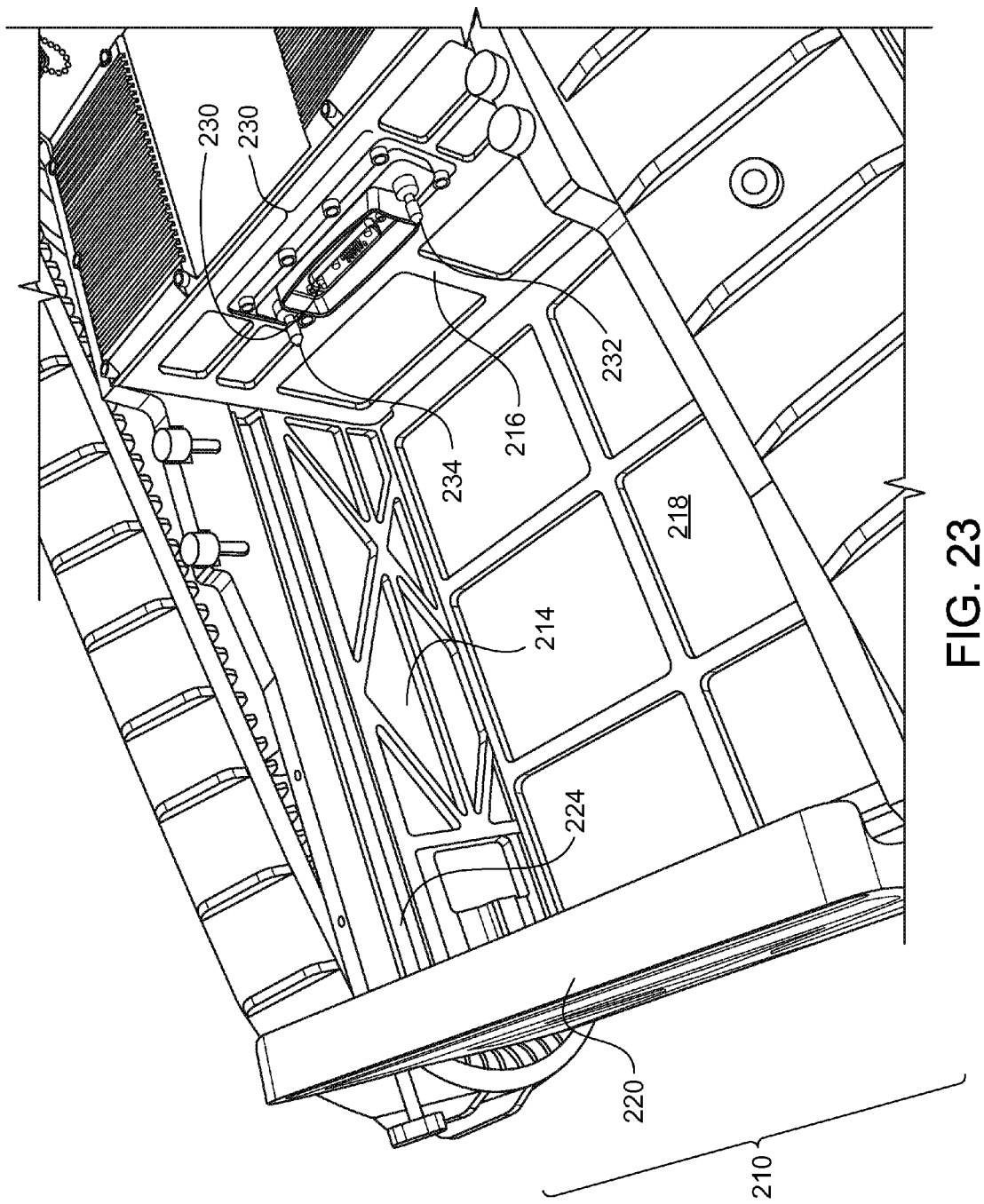
FIG. 23 is a perspective view of a battery holder of a robotic vehicle.
Figure 24:
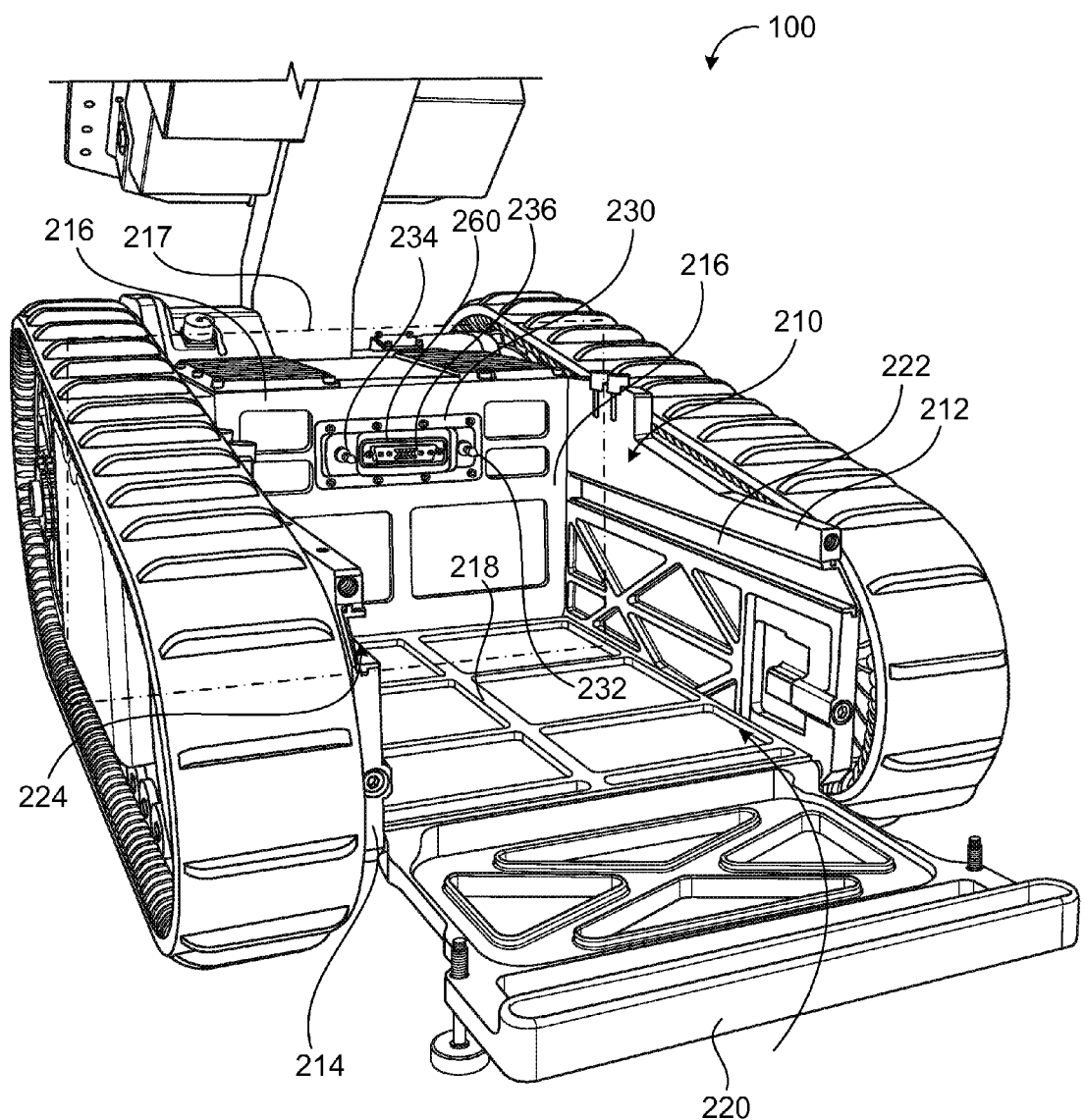
FIG. 24 is a perspective view of a battery holder of a robotic vehicle with a gate open.
Figure 25:
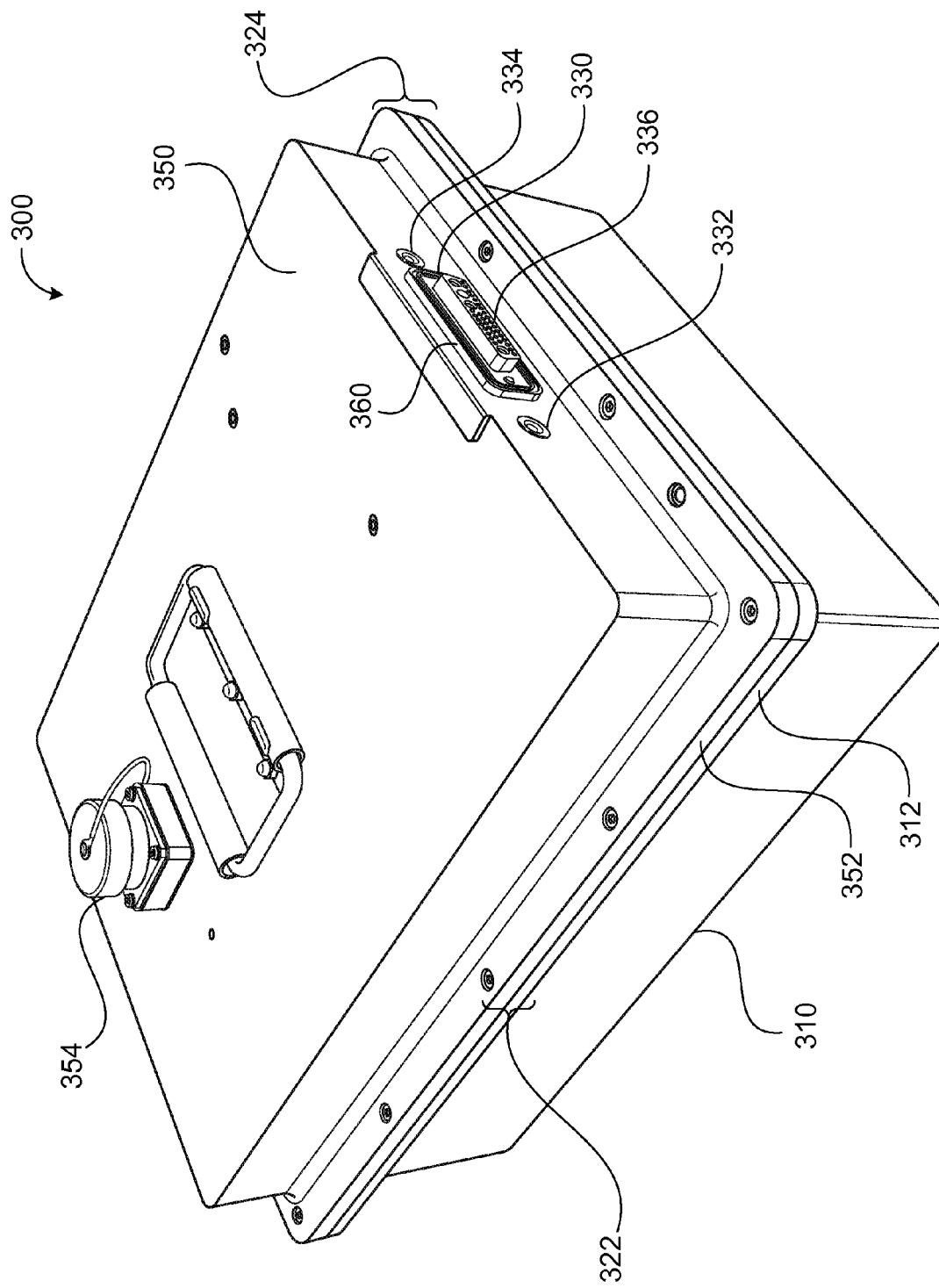
FIG. 25 is a perspective view of a battery unit for a robotic vehicle.
Figure 26:
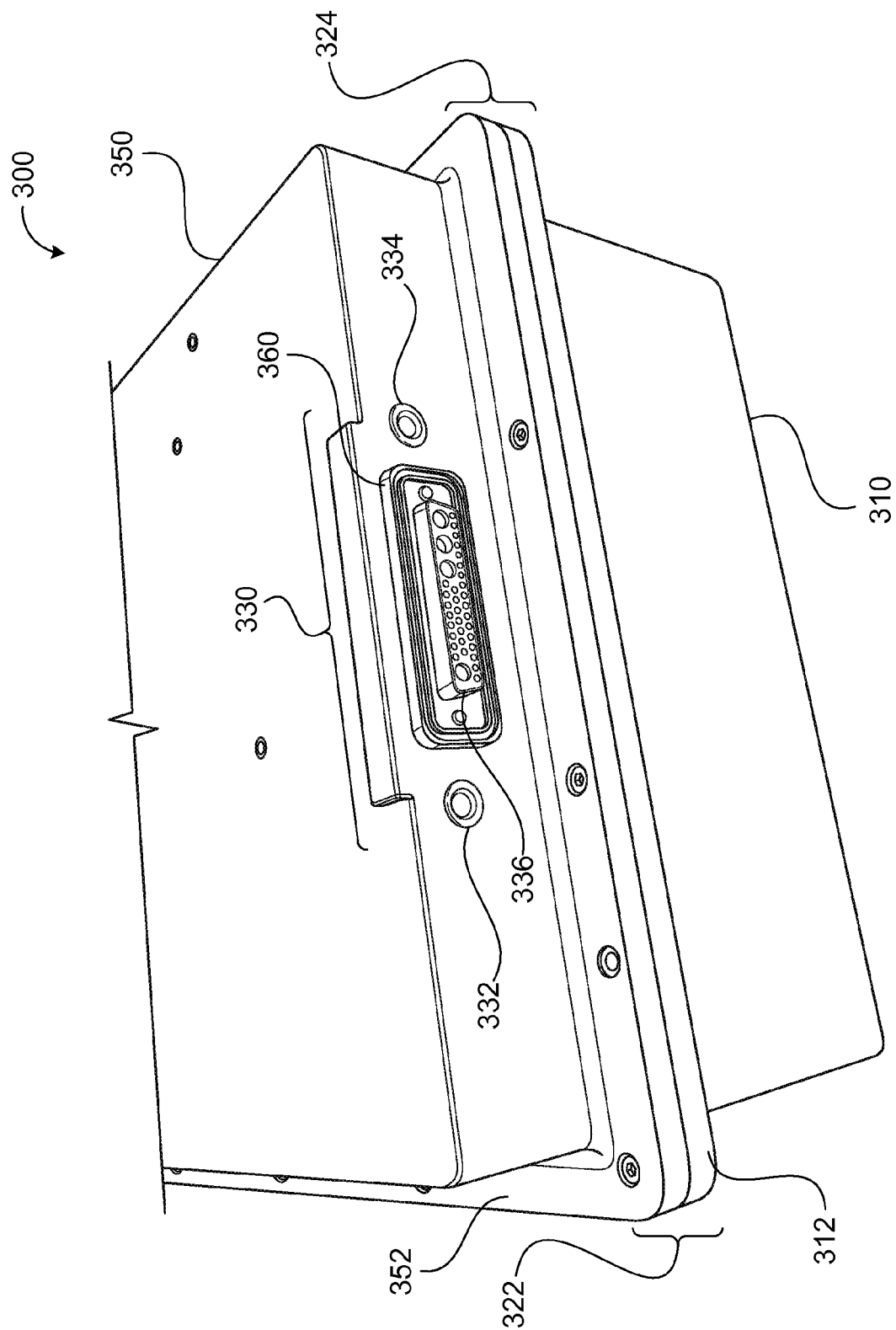
FIG. 26 is a perspective view of a connector of a battery unit for a robotic vehicle.
Figure 27:
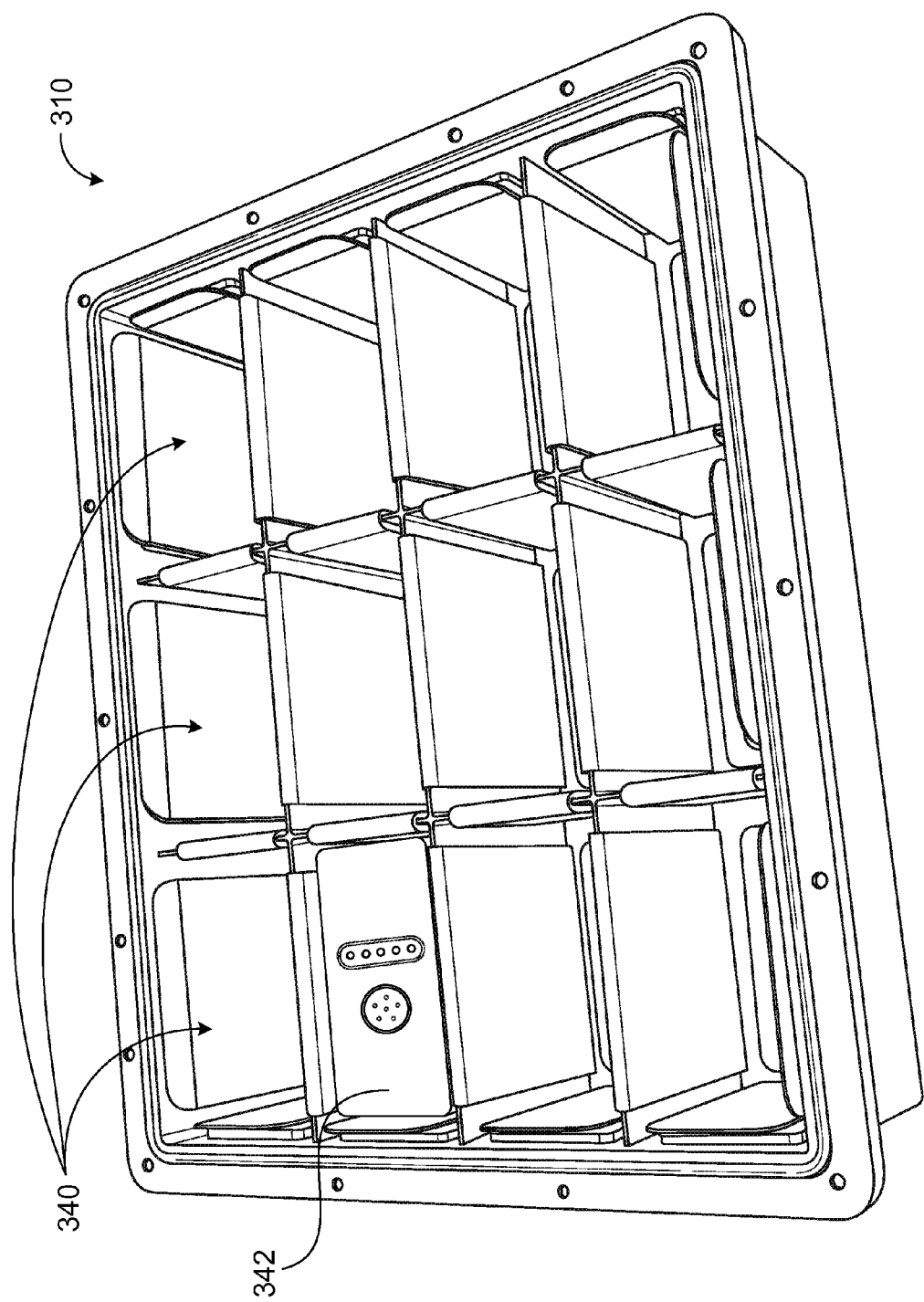
FIG. 27 is a perspective view of battery receptacles of a battery unit for a robotic vehicle.
Figure 28:
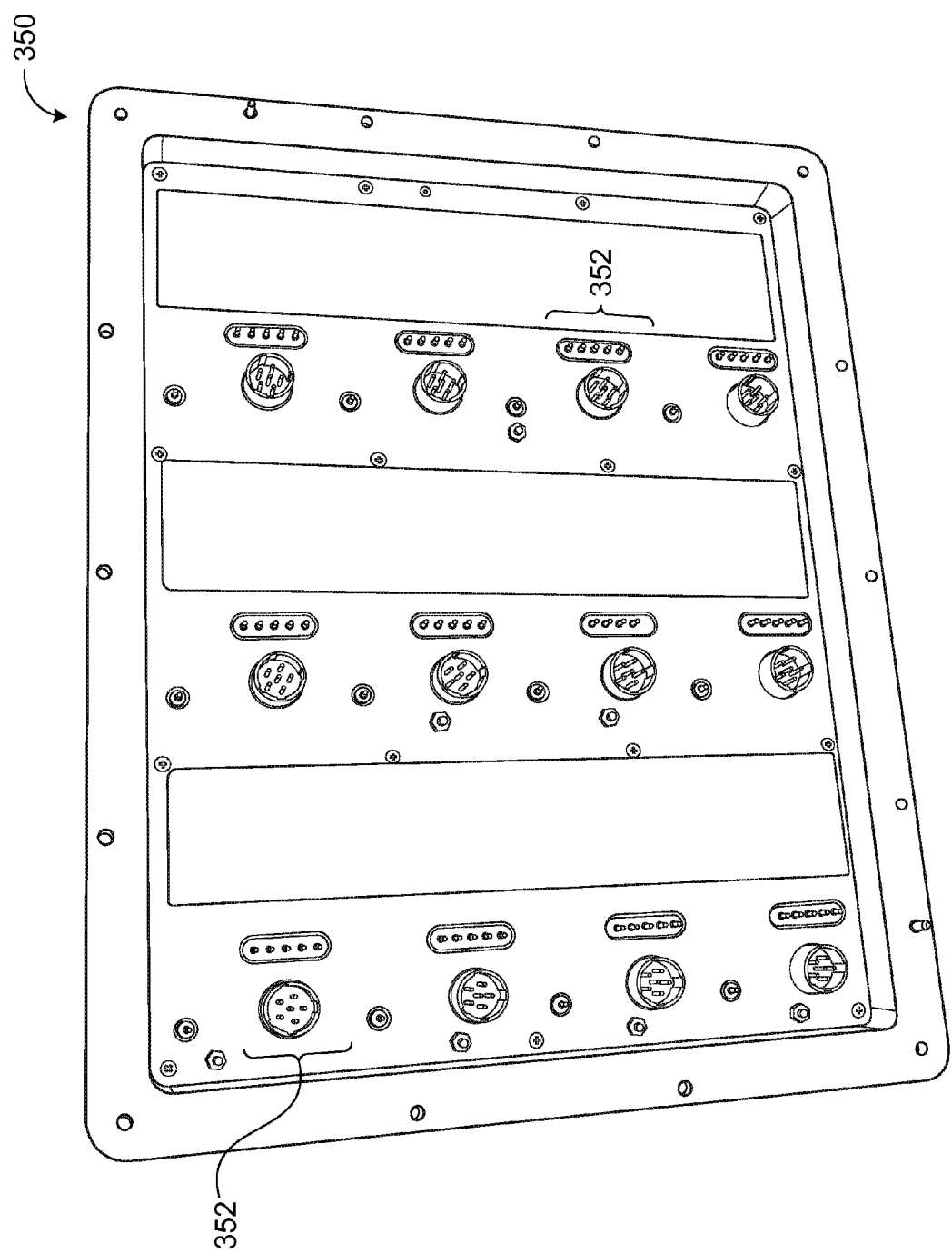
FIG. 28 is a perspective view of a cover of a battery unit for a robotic vehicle.

Referring to FIGS. 19-21, modular decks 810A, 810B, 810C are removable payload decks 810 modularly secured to a deck assembly base 805 or an electronics bin 90 to form the deck assembly 80. The modular decks 810A, 810B, 810C maintain connectivity to functional payloads 500 located on the decks 810A, 810B, 810C while allowing interchangeability with the deck assembly base 805. The modular decks 810A, 810B, 810C receive power and communication from a deck connector 820 attached by a wiring harness 822. The deck connector 820 may be connected to a connection point 812 on the deck base 805. FIG. 19 depicts a development deck 810A including sparsely spaced connector pads 810. FIG. 20 depicts a mule deck 810B including netting 830 for carrying loads and at least one connector pad 810. FIG. 21 depicts a manipulator deck 810C including an integral bracing 840 for a large manipulator arm. The integral bracing 840 housing at least one connector pad 812. The connectors pads 812 available on the decks 810A, 810B, 810C each carry 42V, up to 18 A power; ground; and Ethernet, for example. FET switches connected to each connector pad 810 are overload protected and are controlled by a digital signal processor (DSP) on the deck to distribute power. The DSP is controlled via a controller area network (CAN) bus, a known industrial and automotive control bus.

Referring again to FIGS. 3-4, the deck assembly 80 may include front and rear functional payload power connectors, 816 and 818, and a user interface panel 220. FIG. 2 illustrates an example where the deck assembly 80 includes front and rear sensor pods 840, 850, which may be removable. In some implementations, the sensor pods 840, 850 provide infrared, chemical, toxic, light, noise, and weapons detection, as well as other types of sensors and detection systems. A primary driving sensor may be housed in a separate audio/camera sensor module mounted to the deck assembly 80 that contains at least one visible spectrum camera. Audio detection and generation is realized using an audio/camera sensor module mounted to the deck assembly 80, in one example. Other sensors include inertia measurement units, accelerometers, and gyroscopes for determining the location and orientation (e.g., angular position) of various components, such as the payload deck assembly 80 and/or payload 500 with respect to the chassis 20.

Figure 5:
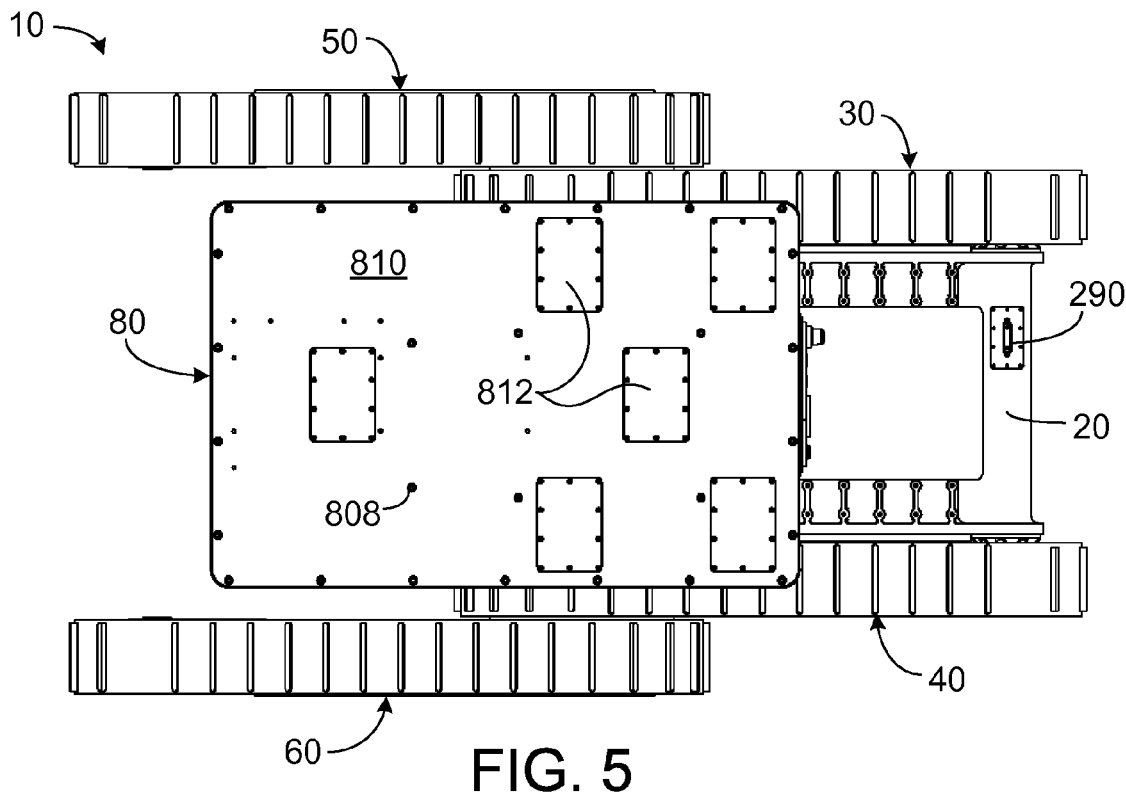
FIG. 5 is a top view of the robotic vehicle shown in FIG. 1.

In some implementations, robotic vehicle 10 tows a trailer connected to rear payload connector 290, as shown in FIG. 5. Exemplary payloads for the trailer include a small generator, which significantly extends both range and mission duration of robotic vehicle, field equipment, and additional functional payload units 500 attachable to the deck assembly 80.

Figure 6:
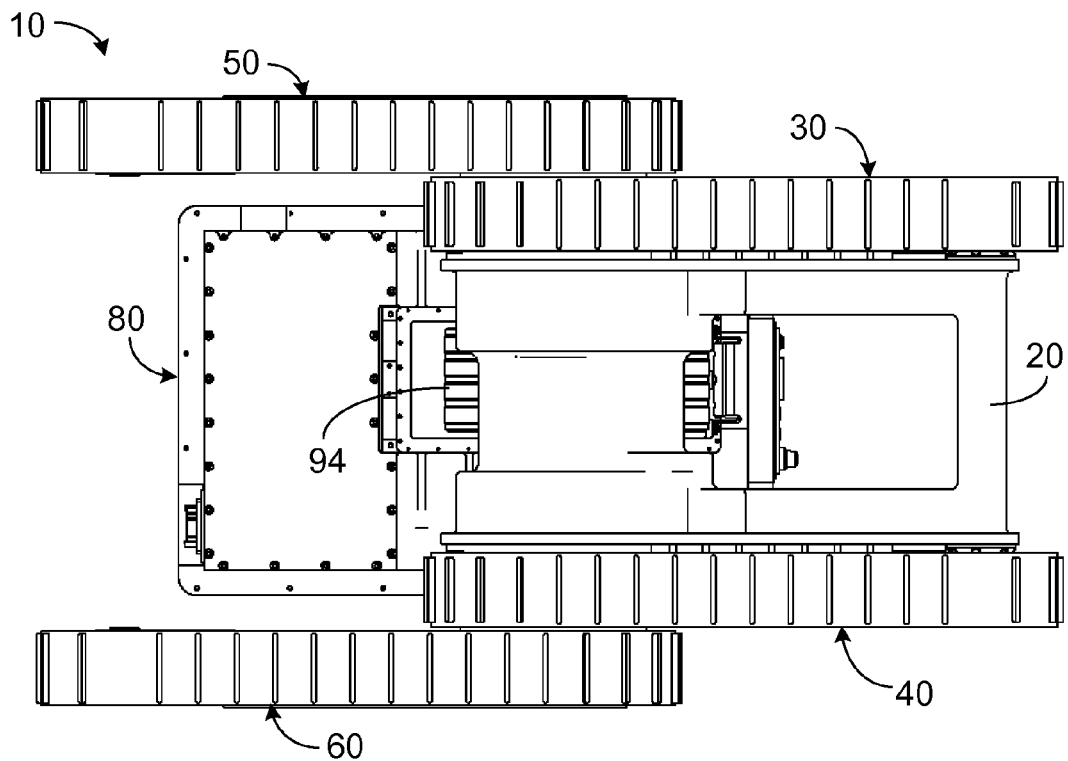
FIG. 6 is a bottom view of the robotic vehicle shown in FIG. 1.

The robotic vehicle 10, 100 is electrically powered (e.g. by a bank of nine standard military BB-2590 replaceable and rechargeable lithium-ion batteries). Referring to FIGS. 2-3, in some implementations, the deck assembly 80, specifically the electronics tub 90, accommodates a slidable, removable battery unit 92. Skid pad 94, as shown in FIG. 6, may be secured to the bottom of the battery unit 92 to protect the battery 92 and aid manageability. The deck assembly 80 may carry an additional battery supply on one of the selectable connection pads 812, increasing the available power capacity (e.g. an additional bank of nine batteries may be carried on the payload deck 810).

Figure 42:
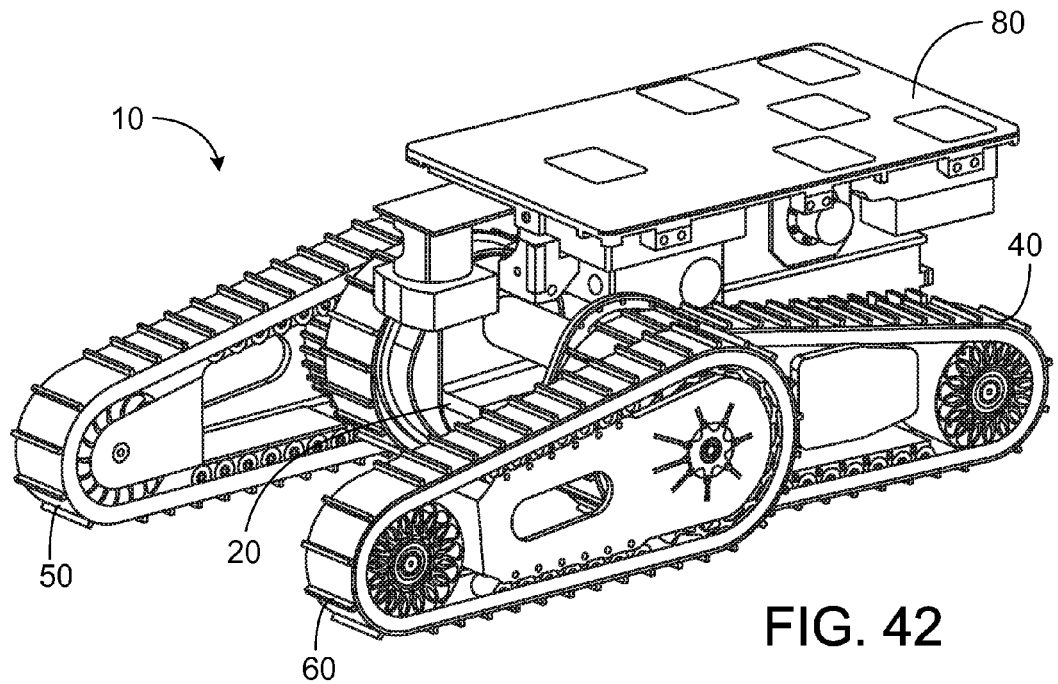
FIG. 42 is a perspective view of a robotic vehicle in a kneeling posture.

Referring to FIGS. 22-28, in some implementations, the robotic vehicle 100 includes a removable battery unit 300 (FIG. 25) received by the chassis 20. Placement of the battery unit 300 on the chassis 20 lowers the overall center of gravity 1010 of the robotic vehicle 100, as compared to placement of the battery unit 92, 300 on the deck assembly 80 of the robotic vehicle 10 (FIG. 2). In some examples, the battery unit 300 weighs about 58 lbs. When the deck assembly 80 is moved to its stowed position (as shown in FIG. 42), the battery unit 300 is in substantially the same position for both configurations of the robotic vehicle 10, 100, thereby maintaining a same or substantially similar maximum side tip angle $\phi$ (FIG. 38) while driving in the deck stowed position. Lowering the overall center of gravity 1010 of the robotic vehicle 100 also allows for a reduced width W of the robotic vehicle 100 (e.g., less than or equal to about 31 inches (78.7 cm)), while maintaining the same or substantially similar maximum side tip angle $\phi$ while driving in a deck deployed position (see e.g., FIGS. 11 and 39), as compared to the robotic vehicle 10 having the battery unit 92, 300 on the deck assembly 80.

In the examples shown, the chassis 20 includes a battery unit holder 210 formed by right and left side plates 212, 214, a front plate 216 connected to the right and left side plates 212, 214, and a base plate 218 connected to the right and left side plates 212, 214. The right and left side plates 212, 214 have corresponding battery unit guides 222, 224 (e.g., slots, rails, guide-ways, etc.) that are configured to receive corresponding guide features 322, 324 (e.g., slots, rails, guide-ways, protrusions, pins, etc.) of a battery unit body 310 of the battery unit 300. In some examples, the battery unit holder 210 includes a rear door or gate 220 rotatably connected to the chassis 20, such as to the base plate 218 or the right and left side plates 212, 214 of the battery unit holder 210. The battery unit holder 210 includes a connector mount 230 disposed on the front plate 216 and is configured to receive a corresponding battery unit connector 330 disposed on the battery unit body 310 of the battery unit 300 to provide electrical communication between the battery unit 300 and robotic vehicle 100. In some implementations, the battery unit connector 330 is movable along one or more orthogonal directions on the battery unit body 310 (e.g., a floating connector), so as to allow the battery unit connector 330 to self-align with the connector mount 230. In other implementations, the connector mount 230 or a portion thereof, such as communication features 236, is movable along one or more orthogonal directions in a plane 217 transverse to the guide features 322, 324, e.g., parallel to the front plate 216, so as to allow the connector mount 230 with the battery unit connector 330 to self-align.

To aid alignment of the connectors 230, 330, in some implementations, the connector mount 230 includes first and second locating features 232, 234 (e.g., projections, pins, shafts, and/or spring loaded pins or shafts that retract into the connector mount 230) and communication features 236 (e.g., connection pins, brushes, contact pads, etc.) configured to be received by and mate with corresponding first and second locating features 332, 334 (e.g., receptacles) and communication features 336 (e.g., receptacles, contact pads, etc.) of the battery unit connector 330 of the battery unit 300. The first and second locating features 232, 234 are laterally spaced on opposite sides of the communication features 236 (e.g., where the communication features 236 are disposed between the first and second locating features 232, 234). The battery unit 300 is loaded onto the robotic vehicle 100 by opening the rear door or gate 220 to access the battery unit holder 210 sliding or moving the battery unit 300 along the battery guides 222, 224, which substantially align the battery connector 330 with the connector mount 230, for example, with ±1 cm, and preferably ±2 mm. The battery guides 222, 224 are configured to withstand at least a 50 G shock load without any substantial deformation (e.g., the battery guides continue to accept the battery unit 300 and operate properly). In some examples, the battery guides 222, 224 are made of aluminum, steel, or steel alloy and may be sized to withstand the at least 50 G shock load. As the battery unit 300 is moved to a connected position, the first and second locating features 232, 234 of the connector mount 230 engage and mate with the corresponding first and second locating features 332, 334 of the battery unit 300. The locating features 232, 234, 332, 334 align the communication features 336 of the battery unit 300 with the corresponding communication features 236 of the battery unit holder 210 for establishing electrical communication (e.g., power and/or electrical signal communication) between the battery unit 300 and the robotic vehicle 100 when the communication features 236, 336 are engaged with each other. The rear door or gate 220 may be closed to hold the battery unit 300 in its connected position (e.g., acting as a latch). In some examples, the battery unit 300 and/or the battery holder 210 includes a latch or a portion thereof for securing the battery unit 300 in its connect position. In the examples shown in FIGS. 24-26, the battery unit connector 330 of the battery unit 300 includes a first latch portion 360 and the connector mount 230 includes a second latch portion 260 configured to mate and releasably connect with the first latch portion. In some examples, the locating features 232, 234, 332, 334 include latching functionality (e.g., releasably connecting a detent feature of the locating features 232, 234 of the battery holder 210 with a spring biased feature of the locating features 332, 334 of the battery unit 300) to secure the battery unit 300 in its connected position.

Referring to FIGS. 25-28, the battery unit 300 includes a cover 350 received by the battery unit body 310. In some examples, the battery unit body 310 defines an upper rim 312 that receives a lower rim 352 of the battery unit cover 350. The battery unit cover 350 may be fastened to the battery unit body 310 along the rims 312, 352 (e.g., with fasteners, such as bolts, clamps, etc.). The battery body rim 312 and the received cover rim 352 together form the guide features 322, 324 of the battery unit 300 that are received by the battery unit guides 222, 224 of the battery unit holder 210. The battery body 310 defines one or more battery receptacles 340 configured to receive individual batteries 342 (e.g. standard military BB-2590 replaceable and rechargeable lithium-ion batteries). In some examples, the battery body 310 defines twelve battery receptacles 340. The battery unit 300 may weigh over 50 lbs (e.g., 58 lbs), when holding all twelve batteries 342. The battery unit cover 350 includes one or more battery connectors 352 for engaging and establishing electrical connection with the corresponding batteries 342 held in the battery receptacles 340, when the battery unit cover 350 is covering the battery unit body 310 in a closed position (e.g., attached to the battery unit body 310). In some implementations, the battery unit 300 is hermetically sealed (e.g., water tight) with battery unit cover 350 in its closed position on the battery unit body 310. The battery unit cover 350 may include a power connector 354 for receiving a corresponding mating power connector to provide power to a connected device. The cover power connector 354 may provide power at the same or at a reduced level of that delivered by the communication features 336 of the battery unit 300.

In some implementations, the connector 330 of the battery unit 300 includes a corded plug that is manually plugged into a corresponding outlet on the robotic vehicle 10, 100 to deliver power from the battery unit 300 to the robotic vehicle 10, 100.

Figure 29:
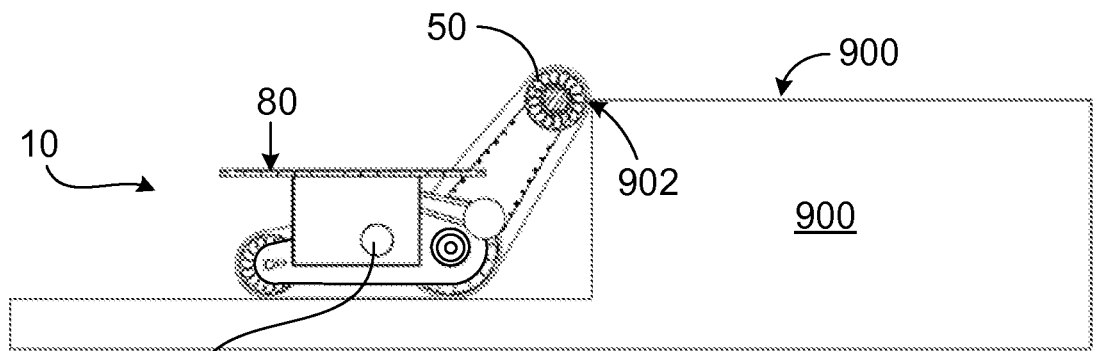
FIGS. 29-32 are side views of a robotic vehicle climbing.
Figure 30:
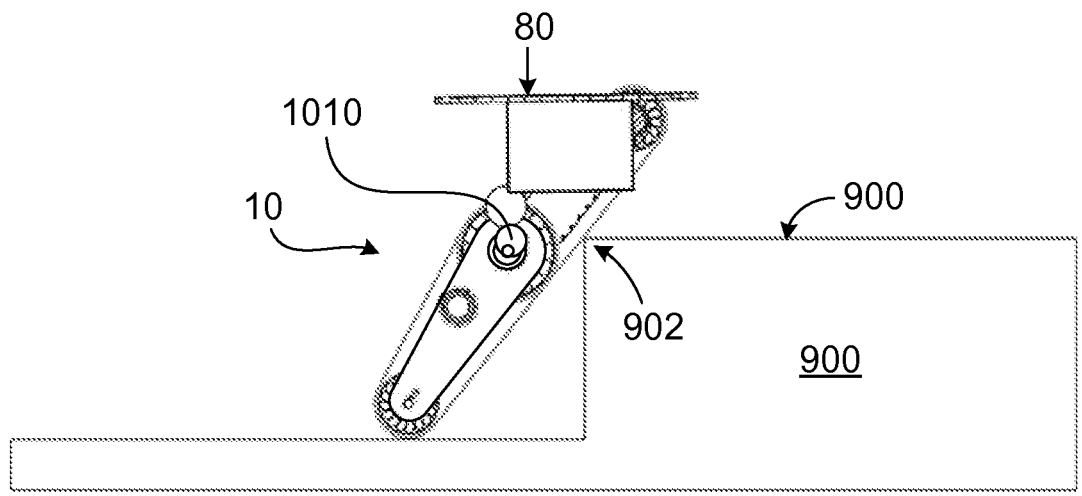
Figure 31:
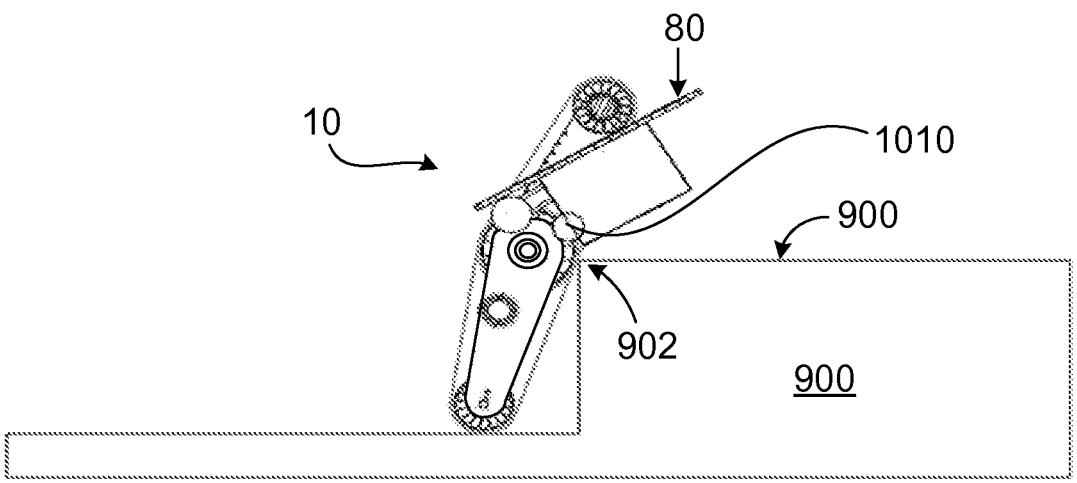
Figure 32:
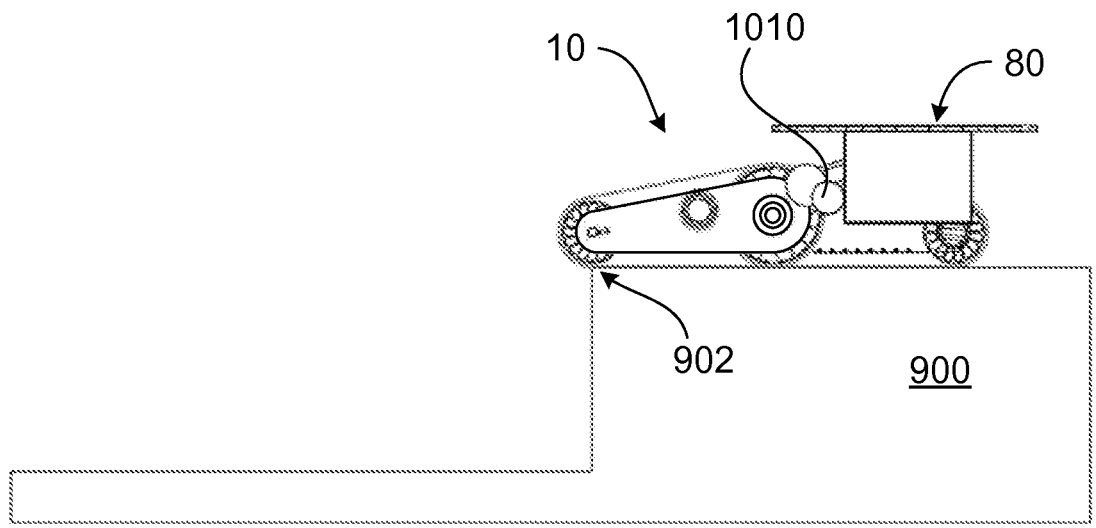

FIGS. 29-32 illustrate the robotic vehicle 10, 100 climbing a step by using the independently controllable pivot drivers 720 and 740 to control both fore-aft position and pitch orientation of the deck assembly 80 with respect to the chassis 20 to selectively displace the center of gravity 1080 of the deck assembly 80 both forward and rearward of the center of gravity 1020 of the chassis 20, thereby shifting the overall center of gravity 1010 of the robotic vehicle 10, 100. Referring to FIG. 29, in step S1, the robotic vehicle 10, 100 initiates step climbing by pivoting the first and second flippers 50 and 60, respectively, upward to engage the edge 902 of the step 900. The robotic vehicle 10, 100 also positions the center of gravity 1080 of the deck assembly 80 above the front end of chassis 20. Next, as shown in FIGS. 30-31, in steps S2 and S3, the robotic vehicle 10, 100 pivots the first and second flippers 50 and 60 downward on the edge 902 of the step 900 to engage the top 904 of the step and drives forward. In FIG. 30, illustrating step S2, the deck assembly 80 is further tilted to advance the center of gravity 1010 of the robot 10, 100 (permitting higher obstacles to be climbed). In step S3, the robotic vehicle 10, 100 continues to displace the center of gravity 1080 of the deck assembly 80 beyond the front of the chassis 20, as shown in FIG. 31, by rotating both the first and second pivots, 710 and 730 respectively. Finally, in step S4, as shown in FIG. 32, the robotic vehicle 10, 100 drives forward to pull the chassis 20 over the edge 902 of the step 900. FIGS. 33-36 illustrates the robotic vehicle 10, 100 initiating and completing steps S1-S4 for obstacle climbing with a functional payload 500 secured to the deck assembly 80.

Figure 37:
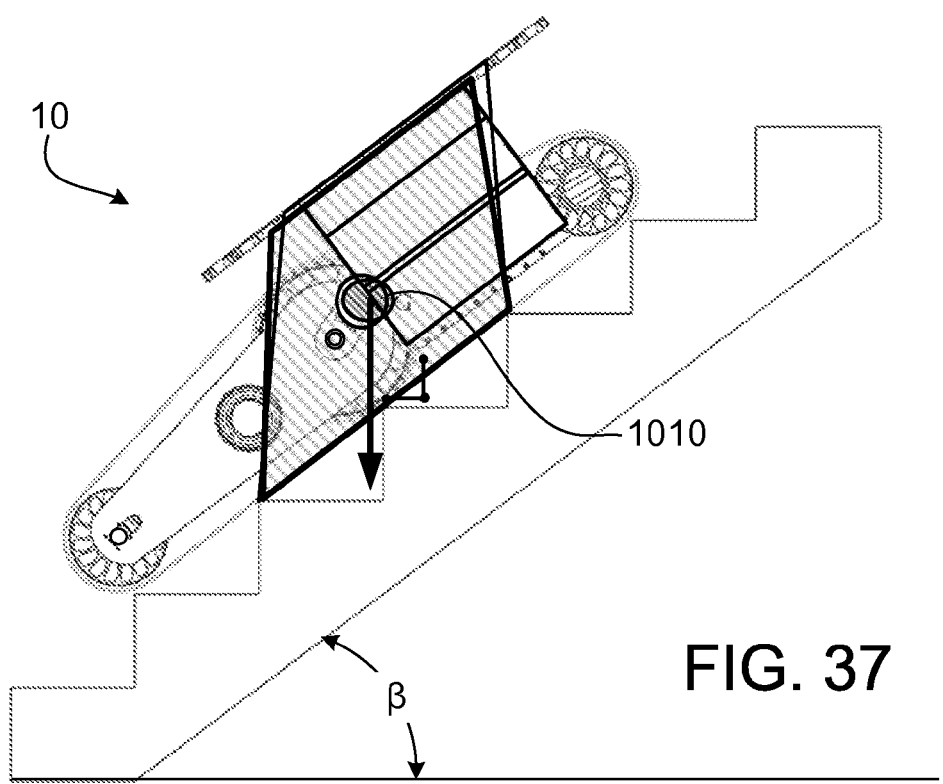
FIG. 37 is a side view of a robotic vehicle climbing stairs.
Figure 38:
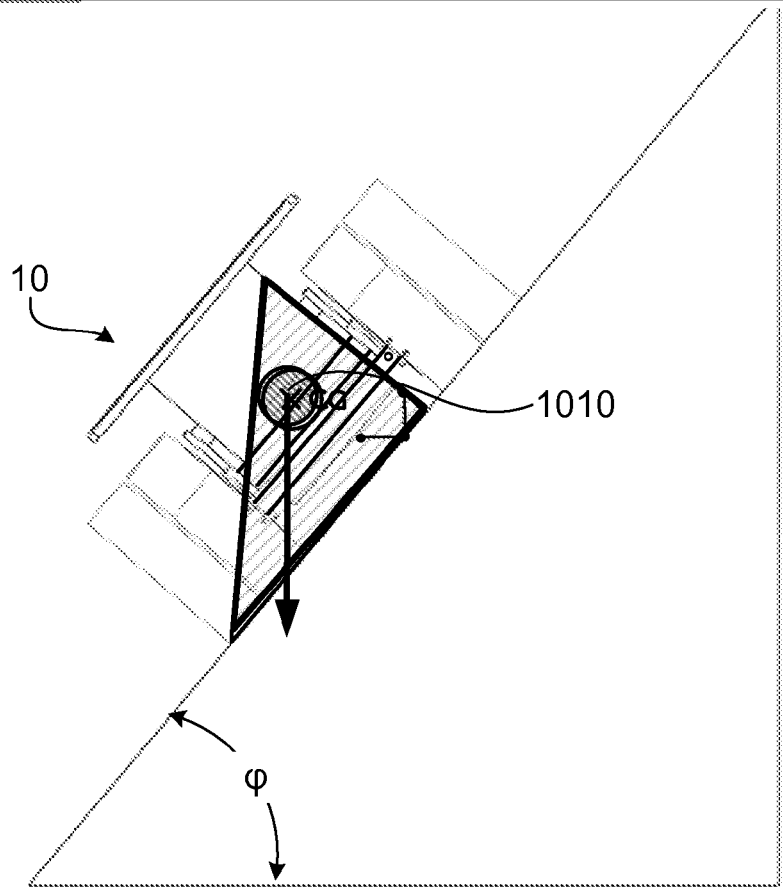
FIG. 38 is a front view of a robotic vehicle traversing an incline.

In some implementations, the robotic vehicle 10, 100 is configured to negotiate obstacles, curbs and steps having a height of about 0.3 m (12 inches) and/or about 0.4 m (15 inches), and across a horizontal gap of about 0.61 m (24 inches). The robotic vehicle 10, 100 has side-to-side horizontal dimensions smaller than standard exterior doorways (e.g. 32 inches) and interior doors (e.g. 30 inches). Referring to FIGS. 37-38, the robotic vehicle 10, 100 is configured as to ascend and descend a flight of stairs having up to a climb angle, $\beta$, of about 37 degrees and/or about 45 degrees, as well as climb and descend an inclined slope, including stopping and starting, on a hard dry surface slope angle, $\beta$, of about 50 degrees. Similarly, the robotic vehicle 10, 100 is physically configured as described herein to climb and descend, including stopping and starting, an inclined grass covered slope having an angle, $\beta$, of about 35 degree grade and/or about 45 degrees. The robotic vehicle 10, 100 is configured to laterally traverse, including stopping and starting, on a grass slope angle, $\beta$, of about 30 degrees and/or about 45 degrees. Furthermore, the robotic vehicle 10, 100 is configured to maneuver in standing water (fresh/sewage) having a depth of about 0.3 m (12 inches) and maintain a speed of about 20 kph (12 mph) on a paved surface, and about 8 kph (5 mph) and or about 16 kph (10 mph) through sand and mud.

Figure 33:
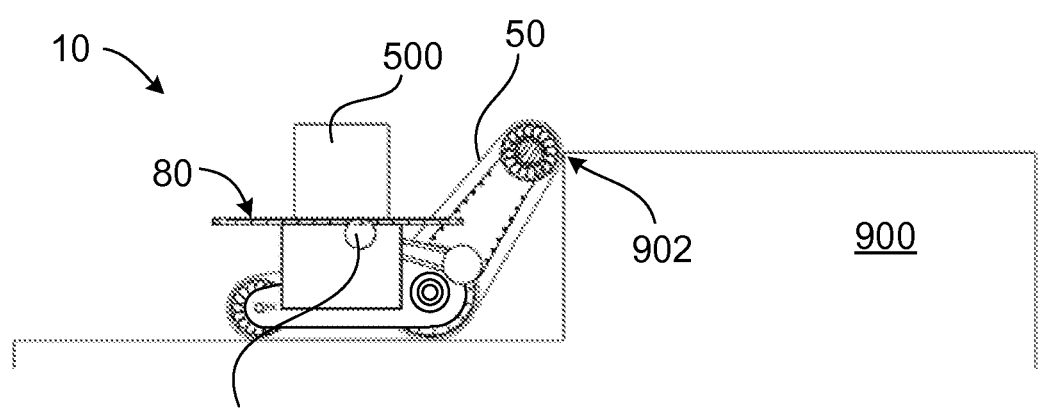
FIGS. 33-36 are side views of a robotic vehicle climbing.
Figure 34:
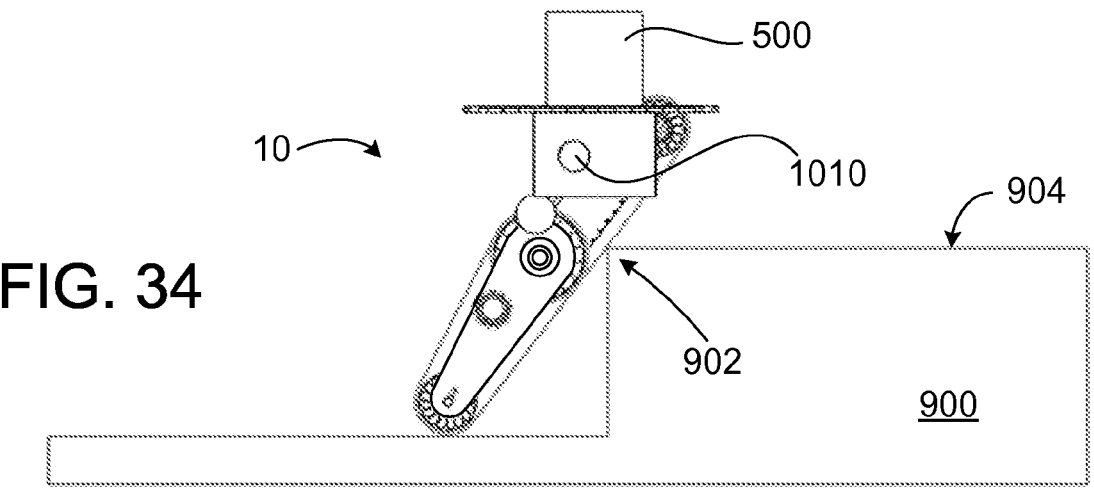
Figure 35:
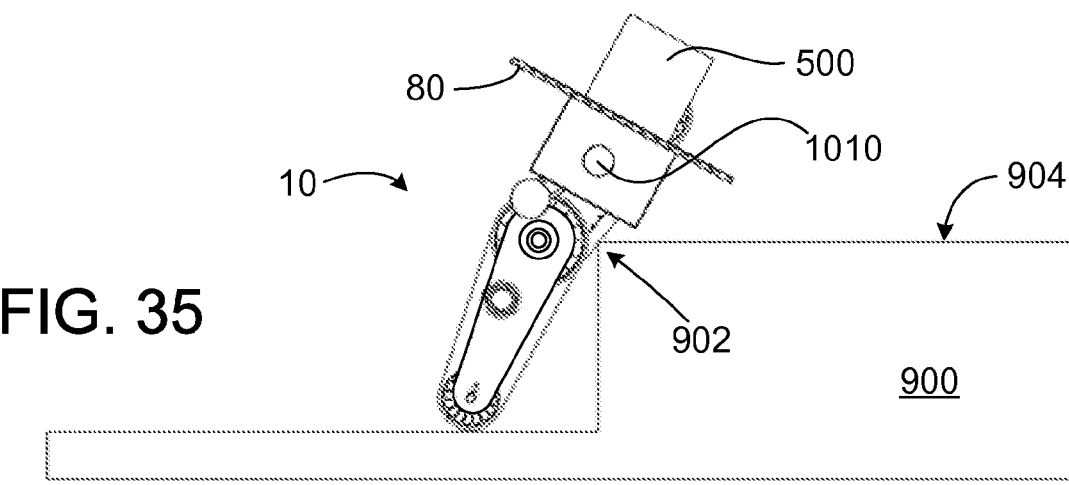
Figure 36:
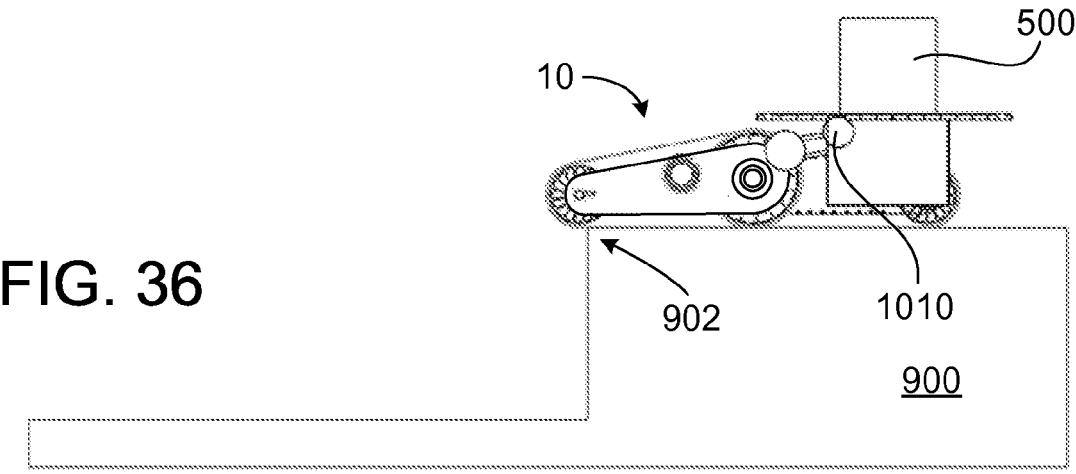

The robotic vehicle 10, 100 supports assisted teleoperation behavior, which prevents the operator from hitting obstacles while using on board obstacle detection/obstacle avoidance (ODOA) sensors and responsive ODOA behaviors (turn away; turn around; stop before obstacle). The robotic vehicle 10, 100 assumes a stair climbing pose, as illustrated in FIG. 33, or a descending preparation pose (similar to the pose shown in FIG. 33, but with the flippers 50, 60 pointing downward) when a stair climbing or stair descending assist behavior is activated, respectively. The robotic vehicle 10, 100 stair climbing behaviors can be configured to control (tilt) the flippers 50, 60 and control the position of the center of gravity shifter 70 as the robot 10, 100 negotiates stairs. A stair climbing assist behavior keeps the robotic vehicle 10, 100 on a straight path up stairs and, in one example, may maintain a roll angle of about zero degrees.

The robotic vehicle's 10, 100 control software provides autonomous capabilities that include debris field mapping, obstacle avoidance, and GPS waypoint navigation. The robotic vehicle 10, 100 can determine position via a global positioning system (GPS) receiver, housed in a separate sensor module 500.

The robotic vehicle 10, 100 is fully operational after exposure to a temperature range of about −40° C. to about 71° C. (−40° F. to 160° F.) in a non-operating mode and is fully operational in a temperature range of about −32° C. to about 60° C. (−26° F. to 140° F.). The robotic vehicle operates during and after exposure to relative humidity up to about 80 percent, in varied weather conditions. The robotic vehicle 1, 1000 also operates during and after exposure to blowing sand and/or rain, freezing rain/ice, and in snowfall up to about 0.1 m (4 inches) in depth.

Figure 39:
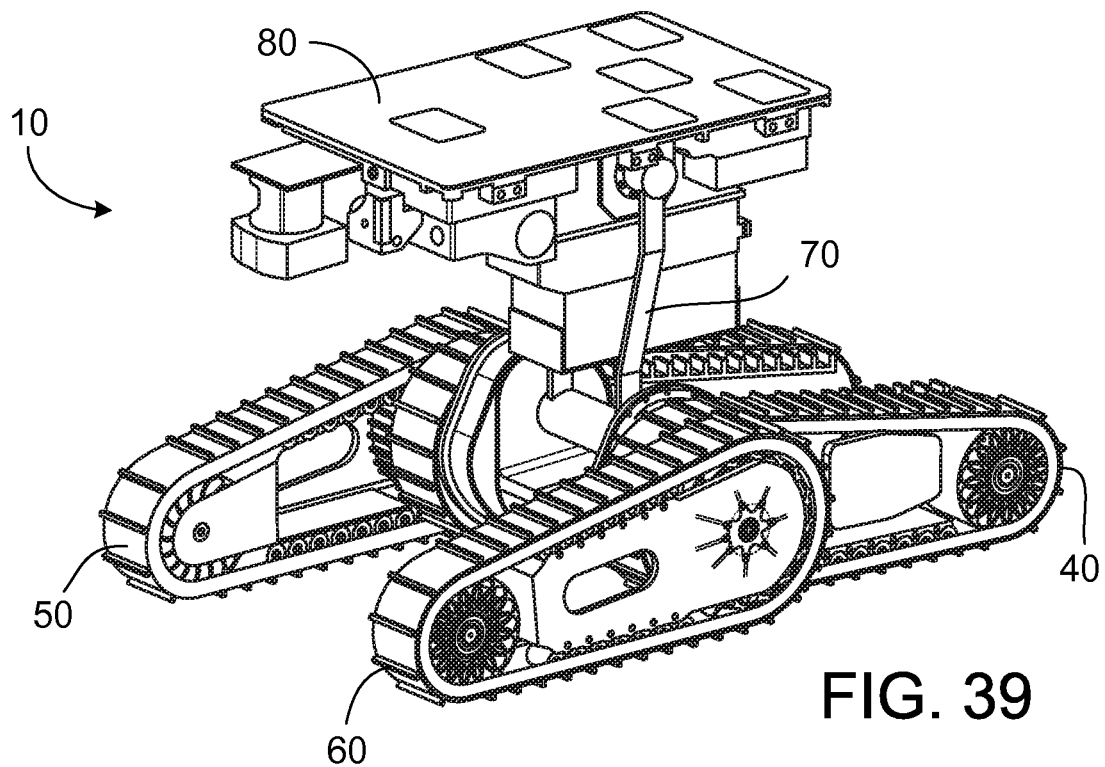
FIG. 39 is a perspective view of a robotic vehicle in a neutral posture.
Figure 40:
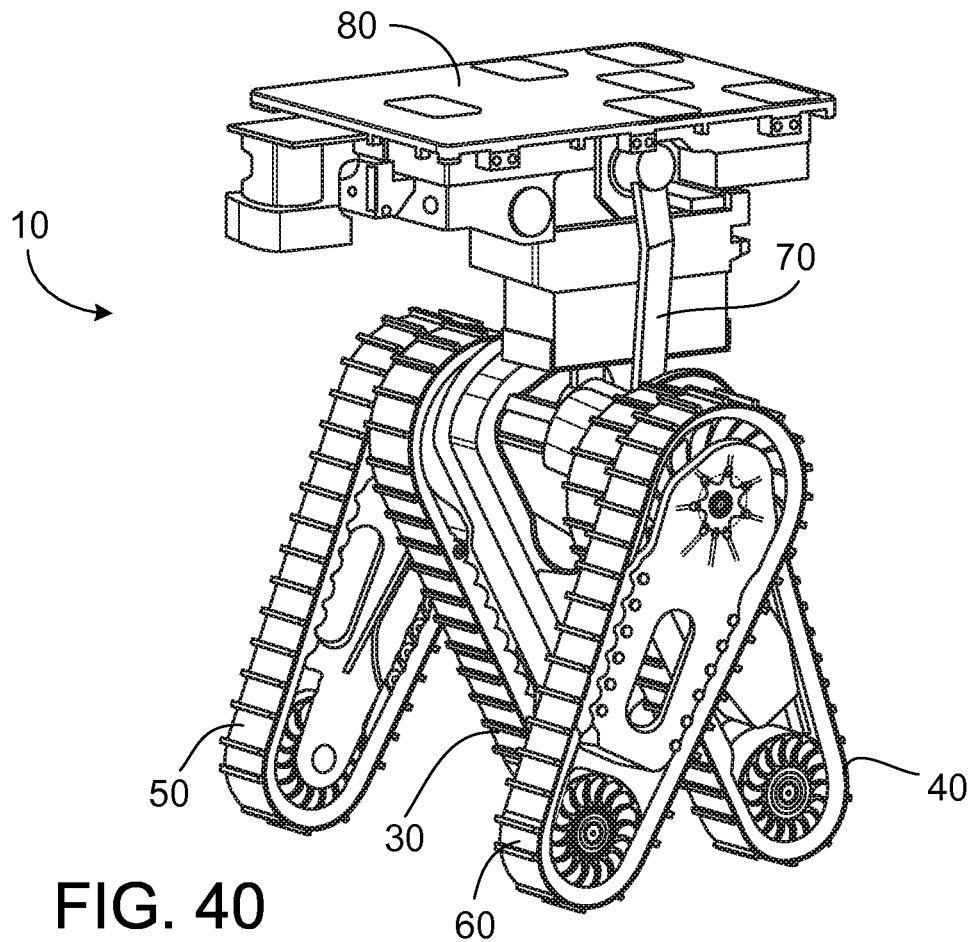
FIG. 40 is a perspective view of a robotic vehicle in a standing posture.
Figure 41:
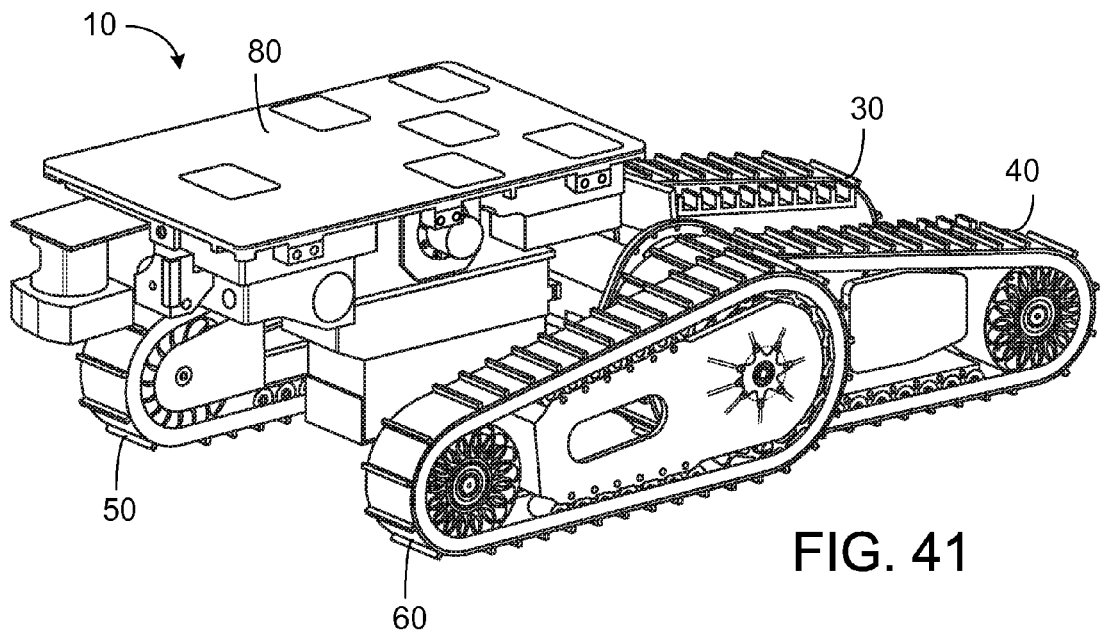
FIG. 41 is a perspective view of a robotic vehicle in a kneeling posture.

Referring to FIGS. 39-42, the robotic vehicle 10, 100 may exhibit a variety of postures or poses to perform tasks and negotiate obstacles. Although the postures or poses are shown with respect to one type of linkage 70, other linkages 700 (FIG. 11) may be used to attain the same postures and poses as well. The linkage 70 together with the deck assembly 80, chassis 20, and flippers 50, 60 all move to attain a number of standing postures. FIG. 39 depicts robotic vehicle 10, 100 in a neutral posture. FIG. 40 depicts the robotic vehicle 10, 100 in one standing posture wherein the distal end of flippers 50 and 60 approaches the leading end of the chassis 20 to form an acute angle between the flippers 50 and 60 and the chassis 20. The linkage 70 is entirely above a common axis 15 of the flippers 50 and 60 and the chassis 20. In one example, the deck assembly 80 tilts independently with respect to the robotic vehicle 10. The acute angle achieved between the flippers 50 and 60 and the chassis 20 varies the standing positions without changing the orientation of the deck assembly 80 with respect to the ground. In some examples, the linkage 70 is positionable at least parallel to an imaginary line between the distal and pivot ends of flippers 50 and 60. In additional examples, the second end 703 of the linkage 70 is positionable below an imaginary line between the distal and pivot ends of flippers 50 and 60. In another implementation, the linkage 70 together with the deck assembly 80, chassis 20, and flippers 50 and 60 can move to attain a first kneeling position, as shown in FIG. 41, and a second kneeling position, as shown in FIG. 42.

Figure 43:
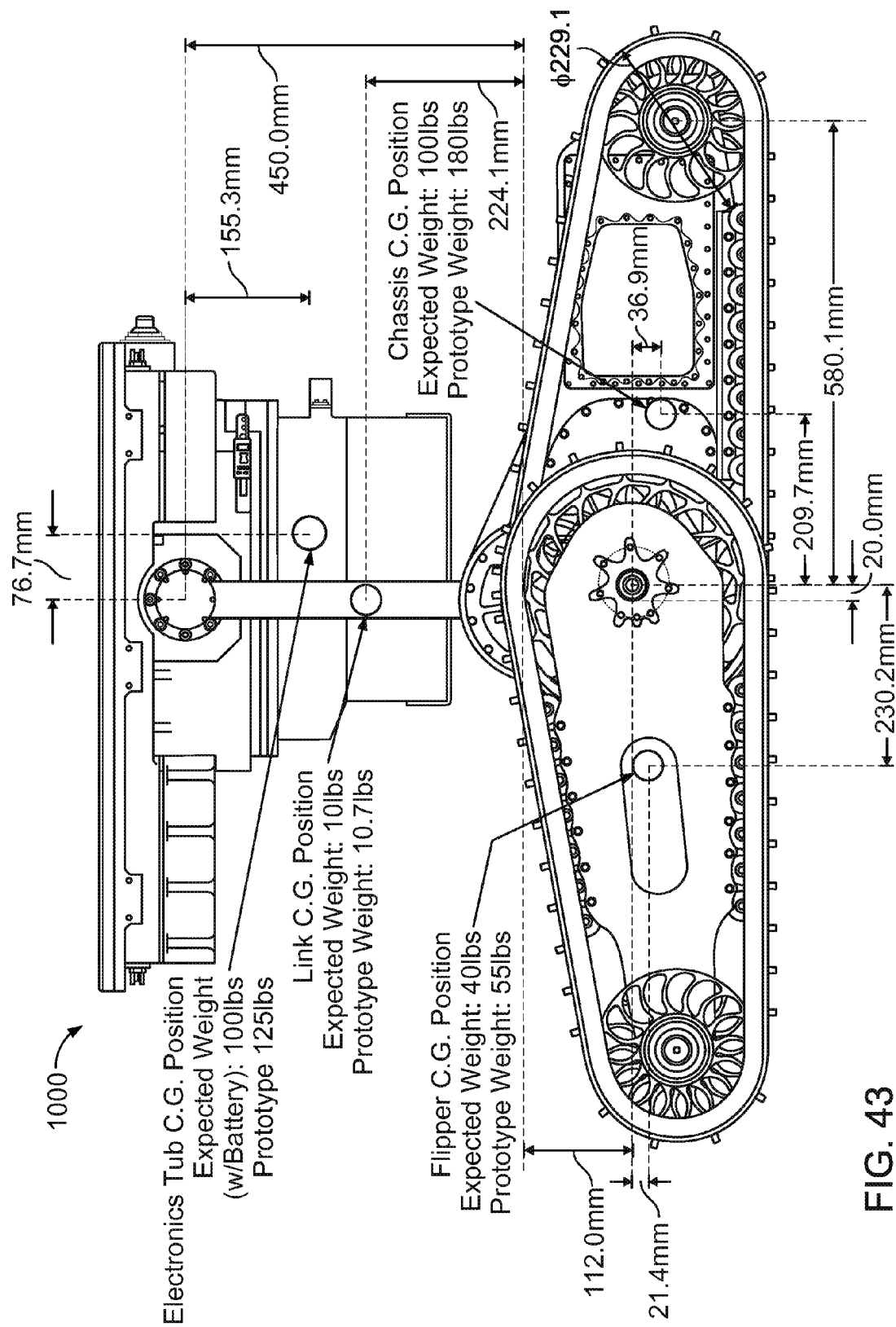
FIG. 43 is a side view of a robotic vehicle.

FIG. 43 illustrates an implementation of centers of gravity of a robotic vehicle 1000 and distances between them. The locations of the centers of gravity within the chassis 20, deck 80, linkage 70, and flippers 50 and 60 and with respect to each other individually may be varied to attain a number of advantages in terms of maneuverability and the ability to perform certain tasks.

There are several advantages to the present CG shifting linkage 70 (having independent, powered pivots 710, 730 at the second, deck assembly end 702 and the first, chassis end 701 of the linkage 70) with respect to other structures for shifting a center of gravity of a robotic vehicle. For example, a robot equipped with a CG shifting linkage 70 can scale higher obstacles relative to a robot without such a linkage. In order to do so, the deck assembly 80 is tilted and/or pivoted further forward, moving the overall center of gravity 1010 higher and farther forward. A robot equipped with the linkage 70 can scale higher obstacles when bearing a payload 500 on top of the deck assembly 80 than without a payload 500. A high, heavy payload 500 can be tipped with the linkage 70 to provide a more pronounced shift of the center of gravity 1010 of the robotic vehicle 10, 100 forward than an empty deck assembly 80. The linkage 70 may raise the deck assembly 80 and an attached a sensor pod module 500 higher in a standing position, as shown in FIG. 40, even with a level deck, because the linkage 70 is connected at one point 730 at the top of the range and also at one point 710 at the bottom of the range. This is valuable because the linkage 70 may place a sensor such as a camera, perception sensor (e.g., laser scanner) or payload sensors 500 relatively higher. Other linkage systems may require connection at more than one point, which may limit the height and/or may also tilt the deck assembly 80 at the highest position while in the standing position.

Other robotic vehicle details and features combinable with those described herein may be found in a U.S. Provisional filed Oct. 6, 2006, entitled "MANEUVERING ROBOTIC VEHICLES" and assigned Ser. No. 60/828,611, the entire contents of which are hereby incorporated by reference.

A number of implementations of the invention have been described. Nevertheless, it will be understood that various modifications may be made without departing from the spirit and scope of the invention. For example, flippers of varied length and payload decks with other means of functional payload attachment, such as snap-on, clamps, and magnets. In addition, in some implementations, the battery unit holder 210 may receive and establish electrical connection with other power sources, such as a fuel cell. Accordingly, other implementations are within the scope of the following claims.

What is claimed is:

1. A robotic vehicle comprising:
a chassis having front and rear ends and supported on right and left driven tracks, each track trained about a corresponding front wheel rotatable about a front wheel axis;
right and left elongated flippers disposed on corresponding sides of the chassis and operable to pivot about the front wheel axis of the chassis, each flipper having a driven track about its perimeter;
a battery unit holder disposed on the chassis for removably receiving a battery unit weighing at least 50 lbs, the battery unit holder comprising:
a guide for receiving and guiding the battery unit to a connected position; and
a connector mount having locating features and communication features, the locating features receiving corresponding locating features of the battery unit, as the battery unit is moved to its connected position, to align the communication features of the connector mount with corresponding communication features of the battery unit;
wherein the communication features of the connector mount are movable in a plane transverse to the guide to aid alignment of the communication features for establishment of an electrical connection therebetween when the battery unit is in its connected position.

2. The robotic vehicle of claim 1, wherein the battery unit holder further comprises a latch for securing the battery unit in its connected position.

3. The robotic vehicle of claim 2, wherein the latch comprises a gate pivotally coupled to the chassis.

4. The robotic vehicle of claim 1, wherein the battery unit holder guide comprises right and left battery unit guides configured to receive corresponding guide features of the battery unit.

5. The robotic vehicle of claim 4, wherein the battery unit holder comprises:
right and left side plates having the corresponding right and left battery unit guides; and
a front plate connected to the right and left side plates, the connector mount of the battery unit holder disposed on the front plate;
wherein the battery unit slides along the battery unit guides to substantially align a connector of the battery unit with the connector mount of the battery unit holder.

6. The robotic vehicle of claim 1, wherein the guide is configured to withstand at least a 50G shock load while remaining operational.

7. The robotic vehicle of claim 1, wherein the locating features of the connector mount comprise first and second spaced apart projections configured to be received by and mate with corresponding first and second locating receptacles of the battery unit.

8. A robotic vehicle comprising:
a chassis having front and rear ends and supported on right and left driven tracks, each track trained about a corresponding front wheel rotatable about a front wheel axis;
right and left elongated flippers disposed on corresponding sides of the chassis and operable to pivot about the front wheel axis of the chassis, each flipper having a driven track about its perimeter;
a deck assembly configured to receive a removable payload; and
a linkage connecting the deck assembly to the chassis, the linkage having a first end rotatably connected to the chassis at a first pivot, and a second end rotatably connected to the deck assembly at a second pivot, both of the first and second pivots including independently controllable pivot drivers operable to rotatably position their corresponding pivots to control both fore-aft position and pitch orientation of the deck assembly with respect to the chassis;
wherein the linkage comprises a single unitary link connecting the deck assembly to the chassis; and
wherein the independently controllable pivot drivers provide both fore-aft position and pitch orientation of the deck assembly with respect to the chassis to selectively displace a center of gravity of the deck assembly both forward and rearward of a center of gravity of the chassis.

9. A robotic vehicle comprising:
a chassis having front and rear ends and supported on right and left driven tracks, each track trained about a corresponding front wheel rotatable about a front wheel axis;

right and left elongated flippers disposed on corresponding sides of the chassis and operable to pivot about the front wheel axis of the chassis, each flipper having a driven track about its perimeter;

a deck assembly configured to receive a removable payload; and a linkage connecting the deck assembly to the chassis, the linkage having a first end rotatably connected to the chassis at a first pivot, and a second end rotatably connected to the deck assembly at a second pivot, both of the first and second pivots including independently controllable pivot drivers operable to rotatably position their corresponding pivots to control both fore-aft position and pitch orientation of the deck assembly with respect to the chassis;

wherein the linkage comprises a single unitary link connecting the deck assembly to the chassis; and wherein the deck assembly is configured to receive a removable payload on top and bottom portions of the deck assembly, a controller recognizing the receipt and placement of the payload on the deck assembly.

10. A robotic vehicle comprising:

a chassis having front and rear ends and supported on right and left driven tracks, each track trained about a corresponding front wheel rotatable about a front wheel axis;

right and left elongated flippers disposed on corresponding sides of the chassis and operable to pivot about the front wheel axis of the chassis, each flipper having a driven track about its perimeter;

a deck assembly configured to receive a removable payload; and a linkage connecting the deck assembly to the chassis, the linkage having a first end rotatably connected to the chassis at a first pivot, and a second end rotatably connected to the deck assembly at a second pivot, both of the first and second pivots including independently controllable pivot drivers operable to rotatably position their corresponding pivots to control both fore-aft position and pitch orientation of the deck assembly with respect to the chassis;

wherein the linkage comprises a single unitary link connecting the deck assembly to the chassis; and wherein the chassis has a center of gravity between its front and rear ends, each flipper having a pivot end, a distal end, and a center of gravity therebetween, the linkage having a center of gravity between its first and second ends, and the deck assembly having a leading end, and a trailing end, and a center of gravity therebetween, the second pivot disposed on the deck assembly substantially at a mid-point between the leading and trailing ends of the deck assembly.

11. The robotic vehicle of claim 10, wherein the linkage together with the deck assembly shifts between about 10% and about 50% of the vehicle weight, shifting a combined center of gravity of the vehicle between an aft center of gravity position intermediate the front and rear ends of the chassis and a fore center of gravity position intermediate the distal and pivot ends of the flippers.

12. A robotic vehicle comprising:

a chassis having front and rear ends and supported on right and left driven tracks, each track trained about a corresponding front wheel rotatable about a front wheel axis;

right and left elongated flippers disposed on corresponding sides of the chassis and operable to pivot about the front wheel axis of the chassis, each flipper having a driven track about its perimeter;

a deck assembly configured to receive a removable payload; and a linkage connecting the payload deck to the chassis, the linkage having a first end rotatably connected to the chassis at a first pivot, and a second end rotatably connected to the deck assembly at a second pivot, both of the first and second pivots including independently controllable pivot drivers operable to rotatably position their corresponding pivots to control both fore-aft position and pitch orientation of the deck assembly with respect to the chassis;

wherein the deck assembly comprises:

a deck base pivotably connected to the linkage at the second pivot and electrically connected to the chassis to receive power and communication therefrom; and at least one connection point disposed on the deck base and configured to provide a payload power link and a payload communication link;

wherein top and bottom portions of the deck base are each configured to receive a removable payload.

13. The robotic vehicle of claim 12, further comprising a controller in communication with the deck assembly, the controller recognizing the receipt and placement of a payload on the deck assembly.

14. The robotic vehicle of claim 12, wherein the top portion of the deck base receives a modular platform configured to support a removable payload.

15. The robotic vehicle of claim 12, wherein the chassis has a center of gravity between its front and rear ends, each flipper having a pivot end, a distal end, and a center of gravity therebetween, the linkage having a center of gravity between its first and second ends, and the deck assembly having a leading end, and a trailing end, and a center of gravity therebetween, the second pivot disposed on the deck assembly substantially at a mid-point between the leading and trailing ends of the deck assembly.

16. The robotic vehicle of claim 15, wherein the linkage together with the deck assembly shifts more between about 10% and about 50% of the vehicle weight, shifting a combined center of gravity of the vehicle between an aft center of gravity position intermediate the front and rear ends of the chassis and a fore center of gravity position intermediate the distal and pivot ends of the flippers.

17. The robotic vehicle of claim 12, wherein at least a portion of the deck assembly has a width at least as wide as the chassis.

* * * * *